(12) United States Patent
Sethi et al.

(10) Patent No.: US 11,610,433 B2
(45) Date of Patent: *Mar. 21, 2023

(54) SKIN TONE ASSISTED DIGITAL IMAGE COLOR MATCHING

(71) Applicant: Adobe Inc., San Jose, CA (US)

(72) Inventors: Kartik Sethi, East Krishna Nagar (IN); Oliver Wang, Seattle, WA (US); Tharun Mohandoss, Noida (IN); Elya Shechtman, Seattle, WA (US); Chetan Nanda, Subhash Nagar (IN)

(73) Assignee: Adobe Inc., San Jose, CA (US)

(*) Notice: Subject to any disclaimer, the term of this patent is extended or adjusted under 35 U.S.C. 154(b) by 179 days.

This patent is subject to a terminal disclaimer.

(21) Appl. No.: 17/154,830

(22) Filed: Jan. 21, 2021

(65) Prior Publication Data

US 2021/0142042 A1 May 13, 2021

Related U.S. Application Data

(63) Continuation of application No. 16/593,872, filed on Oct. 4, 2019, now Pat. No. 10,936,853.

(51) Int. Cl.
*G06V 40/16* (2022.01)
*G06T 7/90* (2017.01)

(52) U.S. Cl.
CPC .............. *G06V 40/162* (2022.01); *G06T 7/90* (2017.01); *G06T 2207/30201* (2013.01)

(58) Field of Classification Search
CPC .... G06V 40/162; G06V 10/56; G06V 40/161; G06T 7/90; G06T 2207/30201; G06T 11/001; G06T 2207/10024; G06T 2207/20081; G06T 2207/20084
See application file for complete search history.

(56) References Cited

U.S. PATENT DOCUMENTS

| 10,936,853 | B1* | 3/2021 | Sethi ................ G06V 10/56 |
| 2006/0204034 | A1 | 9/2006 | Steinberg et al. |
| 2015/0326842 | A1 | 11/2015 | Huai |

(Continued)

OTHER PUBLICATIONS

"Notice of Allowance", U.S. Appl. No. 16/593,872, dated Jan. 15, 2021, 7 pages.

(Continued)

*Primary Examiner* — Phuoc Tran
(74) *Attorney, Agent, or Firm* — FIG. 1 Patents

(57) ABSTRACT

In implementations of skin tone assisted digital image color matching, a device implements a color editing system, which includes a facial detection module to detect faces in an input image and in a reference image, and includes a skin tone model to determine a skin tone value reflective of a skin tone of each of the faces. A color matching module can be implemented to group the faces into one or more face groups based on the skin tone value of each of the faces, match a face group pair as an input image face group paired with a reference image face group, and generate a modified image from the input image based on color features of the reference image, the color features including face skin tones of the respective faces in the face group pair as part of the color features applied to modify the input image.

20 Claims, 10 Drawing Sheets
(3 of 10 Drawing Sheet(s) Filed in Color)

(56) References Cited

U.S. PATENT DOCUMENTS

2019/0377969 A1    12/2019    Kuo et al.

OTHER PUBLICATIONS

"Pre-Interview First Office Action", U.S. Appl. No. 16/593,872, dated Nov. 27, 2020, 3 pages.
"PyTorch—An open source deep learning platform that provides a seamless path from research prototyping to production deployment", Retrieved at: https://pytorch.org/—on May 22, 2019, 3 pages.
Iandola, Forrest N. et al., "SqueezeNet: AlexNet-level accuracy with 50x fewer parameters and <0.5MB model size", Nov. 4, 2016, 13 pages.
Krizhevsky, Alex et al., "ImageNet Classification with Deep Convolutional Neural Networks", In Advances in Neural Information Processing Systems 25, Dec. 3, 2012, 9 pages.

* cited by examiner

SKIN TONE ASSISTED DIGITAL IMAGE COLOR MATCHING

RELATED APPLICATION

This application is a continuation of and claims priority to U.S. patent application Ser. No. 16/593,872 filed Oct. 4, 2019 entitled "Skin Tone Assisted Digital Image Color Matching," the disclosure of which is incorporated by reference herein in its entirety.

BACKGROUND

Many device users have electronic and computing devices, such as desktop computers, laptop computers, mobile phones, tablet devices, multimedia devices, and other similar devices. These types of computing devices are utilized for many different computer applications, to include graphic design, publication development, digital photo image enhancement, digital video frame enhancement, and the like. Image color is a fundamental aspect of many art, photography, graphic design, and other visualization projects. Color transfer techniques, also referred to as color correction, color mapping, and color balancing, can be used to change the colors of a given input image to match those of a reference image. For example, a graphic designer or artist may want to enhance the content of a particular digital image or digital video frame by applying the overall color appearance or color style of a different digital image or video frame. When the input and reference images are selected, color correspondences can be determined between the images, defining a mapping between the colors in the input image and the selected reference image, and the mapping can then be used to modify the colors of the input image.

Graphic designers and artists often edit the color, contrast, and brightness of photographs and/or video frames (e.g., digital images) to stylize them and achieve a desired visual look, such as when using editing applications like Adobe Photoshop® and Lightroom® for digital image creation and editing, or Adobe Premier Pro® for video editing. However, the process to edit the color, contrast, and brightness of a photo image can require a great deal of creative input time and user expertise to create an edited image or video frame. Some techniques for image color matching have been implemented in the form of computer applications, but the results can produce unrealistic artifacts and result in a poor user experience when using an application as an assistive editing tool. In particular, most of the image color matching techniques that have been developed completely transfer the color and brightness characteristics of an example style image to the edited image without taking into account features of the edited image. A complete color matching is often not desirable and can lead to artifacts in the resulting modified image, creating an image with a poor visual result because the modified image color and brightness may be modified too aggressively based on the example style image.

SUMMARY

This Summary introduces features and concepts of skin tone assisted digital image color matching, which is further described below in the Detailed Description and shown in the Figures. This Summary should not be considered to describe essential features of the claimed subject matter, nor used to determine or limit the scope of the claimed subject matter.

Aspects of skin tone assisted digital image color matching are described. In implementations, a computing device, such as a mobile phone or smartphone, can implement a color editing system used for digital image editing to edit any type of digital image, such as a digital photograph, a digital video frame of a video clip, and the like. A user of the color editing system may want to enhance the content of a particular digital image by applying the overall color features from a different image. The user can select an input image with the content to be enhanced, as well as select a reference image with the color features to apply and modify the input image.

The color editing system includes a facial detection module to detect faces in the input image and in the reference image. The color editing system also includes a skin tone model to determine a skin tone value reflective of a skin tone of each of the faces that are detected by the facial detection module in the input image and/or in the reference image. The skin tone model can be implemented as a convolutional neural network that is trained to determine skin tone values of the faces based on skin tone identifiers and varying lighting features that may alter the skin tone appearance of the faces in the images.

The color editing system also includes a color matching module that can group the faces into one or more face groups based on the skin tone value of each of the faces. The faces detected in the input image are the input image faces that may be grouped into one or more input image face groups, where an input image face group includes one or more of the input image faces having skin tone value differences less than or equal to a grouping threshold. Similarly, the faces detected in the reference image are the reference image faces that may be grouped into one or more reference image face groups, where a reference image face group includes one or more of the reference image faces having skin tone value differences less than or equal to the grouping threshold. The color matching module can also calculate an average skin tone value from the skin tone values of the respective faces in each of the one or more input image face groups and in each of the one or more reference image face groups.

The color matching module of the color editing system can then match a face group pair as an input image face group paired with a reference image face group. The color matching module can determine the face group pair based on a matching criteria of the face group pair having a difference of the respective average skin tone values being less than or equal to a matching threshold. The color matching module identifies input image regions of the input image and reference image regions of the reference image that include the faces detected by the facial detection module in the images. The color matching module can calculate area sums of the input image regions and the reference image regions corresponding to the faces grouped in the respective input image face groups and the respective reference image face groups. The color matching module can then match the face group pair as the input image face group having the largest possible area sum of the input image regions that meets the matching criteria and the reference image face group having the largest possible area sum of the reference image regions that meets the matching criteria, which as noted above is the face group pair having a difference of the respective average skin tone values being less than or equal to the matching threshold.

The color matching module of the color editing system can then generate a modified image from the input image based on the color features of the reference image, where the color features can include using the face skin tones of the respective faces in the face group pair as part of the color features applied to modify the input image. In implementations, the color matching module generates the modified image utilizing midtone color features of the reference image applied to the input image, where the face skin tones in the face group pair can be used as part of the midtone color features for the color matching. The color matching using the midtone color features of the reference image applied to the input image, based on the similar average skin tone values, is effective to maintain the original captured image color of the faces in the input image.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Implementations of skin tone assisted digital image color matching are described with reference to the following Figures. The same numbers may be used throughout to reference similar features and components that are shown in the Figures.

DETAILED DESCRIPTION

Figure 1:
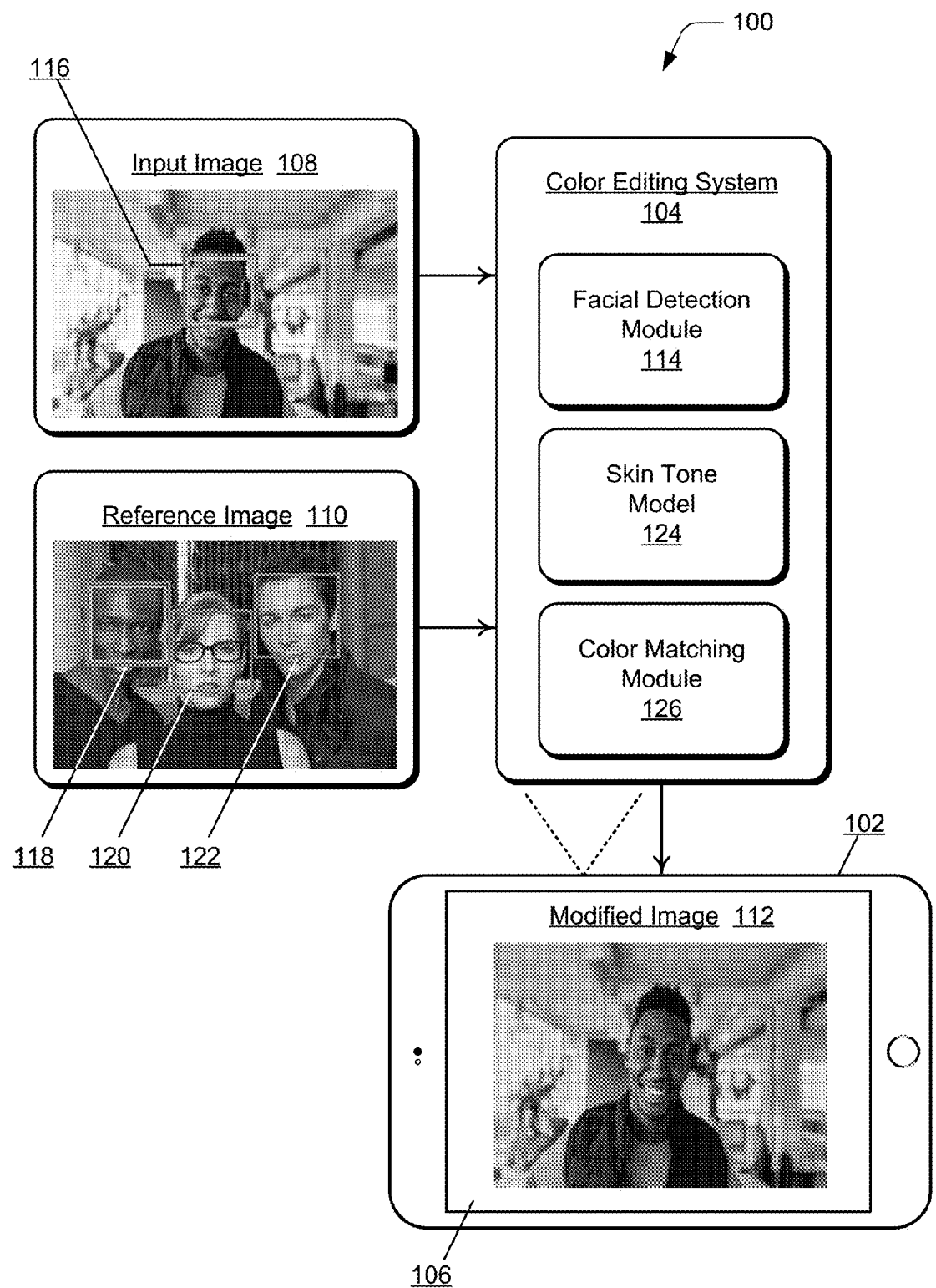
FIG. 1 illustrates an example of skin tone assisted digital image color matching implemented with a mobile computing device in accordance with embodiments as described herein.

Implementations of skin tone assisted digital image color matching are described, and provide a color editing system for color matching between images. Many different types of computer applications are utilized for graphic design, publication development, digital photo enhancement, digital video enhancement, video processing, multi-media production, and the like. Often, graphic designers, artists, and video editing professionals want to enhance the content of a particular digital image or a digital video frame by applying the overall color appearance or color style of a different digital image or video frame. For example, a user of a computing device can select an input image that has color features the user wants to visually enhance by color matching. The user can also select any reference image that has the overall color features, style, and/or brightness to transfer or apply to the selected input image for the color matching. As used herein, the term "digital image" includes any type of digital photograph, a digital video frame of a video clip, and any other type of digital image that may be selected as an input image or a reference image for color matching between images.

Generally, "color matching" is described herein as applying or transferring the color features, style, and brightness of the reference image to the input image to generate or create a modified image that has enhanced color, style, and brightness features. As used herein, the terms "color features" and "color style" are used interchangeably and are intended to be inclusive of the many visual aspects that come together to represent the overall appearance of a digital image. For example, the color style of a digital image may include any number of color features and image appearance factors, such as color, lighting, brightness, highlights, shadows, color midtones, contrast, saturation, tone, and any other type of color features and appearance factors. Color matching is an image processing technique that can be implemented by image and video editing applications like Adobe Photoshop® and Lightroom® for digital image creation and editing, or Adobe Premier Pro® for video editing. In implementations, the pixel color values can be used by a color matching algorithm to transfer the color and brightness characteristics of an example reference image to an input image to modify the input image. For example Adobe Photoshop® provides a "Match Color" command as a user-selectable tool that initiates a user interface of a color matching algorithm to match and adjust several color image features, such as luminance, color range, color intensity, contrast, and other features working in the RGB (red, green, and blue) color space.

A particular concern when color matching the overall color appearance and brightness of a reference image (e.g., a digital image or a digital video frame) applied to a selected input image is how the color matching can change the skin color and tone of persons who are depicted in the images. For example, a graphic designer or artist may want to use the content of a particular digital image or video frame that includes a person who has darker colored skin, but apply the overall color appearance of a different digital image or video frame that includes a person who has lighter colored skin (or vice-versa). An unintended effect of color matching is the change in appearance of the skin tones of persons depicted in the images. These changes in skin tone appearance may not be realistic or comport with how people shown in the images should appear. Notably, most people are keenly aware and likely sensitive to changes in their skin tone as depicted in a digital image or in a video frame or video clip, and even a slight change in color will be very noticeable to the person who is depicted in an image.

Conventional image and video editing applications that apply a color matching algorithm are typically based on just the colors and pixel values extracted from an image, which would then also include the skin tones extracted from the image regions that depict the faces of the people in the images. However, this can create the undesirable results and poor user experience, such as significantly lightening the skin tone of the person with the darker colored skin in the selected input image by applying the skin tone of the person who has the lighter colored skin in the reference image. The lighter colored skin tone of the person in the reference image will be applied to lighten the colors and brightness throughout the selected input image, which may be the intended color matching effect for the overall image, but can result in the unintended effect of significantly lightening the skin tone of the person with the darker colored skin in the selected input image.

In aspects of the described color matching technique for skin tone assisted digital image color matching, a computing device or mobile device (e.g., a mobile phone or tablet device) implements a color editing system, which includes a facial detection module, a skin tone model, and a color matching module. The color editing system can receive the selected input image that has color features to visually enhance by use of the color matching technique, and also receive the reference image that has the overall color features, style, and/or brightness to transfer or apply to the selected input image for the color matching. The input image and/or the reference image can be any digital image that is accessible via the computing device, such as a digital video frame, a digital photo, a digital image that is accessible from cloud storage, downloaded from the Internet, and the like.

The facial detection module of the color editing system can detect faces in the input image and in the reference image, such as by any known technique that may be implemented for facial detection of a face in an image. Although, facial recognition technology is designed to identify or verify a person from a digital image or from a video frame, the facial detection module as described herein is utilized to a lesser degree to detect the occurrence of faces in input images and in reference images, rather than for full recognition and identification of a particular person depicted in the images. The facial detection module can utilize any known technique, or a combination of known, different techniques for facial detection of a face in an image based on the detectable features, commonly referred to as facial landmarks or nodal points that include measurable distances between facial features, such as around the eyes, nose, mouth, cheeks, etc. As noted in the classic Eigenface approach, the ability to merely detect faces, as opposed to recognizing them, was an important development for photo enhancement, and looked at facial feature analysis. Modern, conventional techniques are available as open source code that can be implemented for face detection in an image, such as in a digital photo or a video frame. For example, the OpenCV (open source computer vision) library has open source code for detecting faces in images using Haar feature-based cascade classifiers, implemented as a machine learning based approach to face detection.

In implementations, the skin tone model of the color editing system is a trained convolutional neural network designed to determine a skin tone value that is reflective of the skin tone of each of the faces that are detected by the facial detection module in the input image and/or in the reference image. The skin tone model of the color editing system can be implemented using machine learning, such as the convolutional neural network that is trained to determine the skin tone values of the faces detected in the images based on skin tone identifiers (e.g., labeled skin tone values) and varying lighting features that may alter the skin tone appearance of the faces in the images. Although the human eye can naturally detect skin tones and distinctions in digital images that may be caused by shadows and various lighting features, such as natural lighting or indoor illumination, conventional computing device applications simply determine color based on pixel values in the image regions that include the faces in an image. In aspects of the described color matching technique, the skin tone model takes into account the overall image content, to include the shadows and lighting, to determine the skin tone of faces that are detected in the images.

The color matching module of the color editing system can group the faces detected in the input image and/or in the reference image into one or more face groups based on the skin tone value of each of the faces, as determined by the skin tone model. The faces detected in the input image are the input image faces that may be grouped into one or more input image face groups. Similarly, the faces detected in the reference image are the reference image faces that may be grouped into one or more reference image face groups. Generally, the faces included in a face group have a similar skin tone and appearance, and have a skin tone value difference less than or equal to a grouping threshold. The color matching module can compare the skin tone value differences with other skin tone values of the faces in an input image face group or a reference image face group, and the difference is compared to the threshold to determine whether to add a face to an input image face group or reference image face group that has already been created, or create a new face group.

The color matching module of the color editing system can also calculate an average skin tone value from the skin tone values of the respective faces in each of the one or more input image face groups and in each of the one or more reference image face groups. The average skin tone values of the respective face groups can then be used to correlate group matching of an input image face group paired with a reference image face group. The color matching module can determine the face group pair based on a matching criteria of the face group pair having a difference of the respective average skin tone values being less than or equal to a matching threshold. The color matching module can also calculate area sums of input image regions and reference image regions corresponding to the faces that are grouped in the respective input image face groups and in the respective reference image face groups.

The color matching module can then match a face group pair as the input image face group having the largest possible area sum of the input image regions that meets the matching criteria and the reference image face group having the largest possible area sum of the reference image regions that meets the matching criteria, which as noted above is the face group pair having a difference of the respective average skin tone values being less than or equal to the matching threshold. Accordingly, the group matching to determine the face group pair is an iterative process to find the largest possible input image and reference image face groups having a maximum area sum, and with an average skin tone difference less than or equal to the matching threshold.

The color matching module of the color editing system can then generate the modified image from the input image based on the color features of the reference image, where the color features can include using the face skin tones of the respective faces in the face group pair as part of the color features applied to modify the input image. In implementations, the color matching module generates the modified image utilizing midtone color features of the reference image applied to the input image, where the face skin tones in the face group pair can be used as part of the midtone color features for the color matching.

Alternatively, the color matching module of the color editing system may determine not to use the faces in an input image and/or in a reference image for color matching. For example, if the average skin tone difference between the input image face group and the reference image face group exceeds the matching threshold for face group matching, the faces may not be used for the color matching so as not to alter the appearance of the skin tone of persons in the input image when the color features of the reference image are applied to the input image. Given that people are generally sensitive to changes in the appearance of their skin tone in digital images and/or in video frames in a video clip, the color editing system can determine whether or not to use the face skin tones of the respective faces in the face group pair of the input image face group and the reference image face group as part of the color features applied to modify the input image, so as not to produce unrealistic image content or altered skin tones.

While features and concepts of skin tone assisted digital image color matching can be implemented in any number of different devices, systems, networks, environments, and/or configurations, implementations of skin tone assisted digital image color matching are described in the context of the following example devices, systems, and methods.

FIG. 1 illustrates an example 100 of skin tone assisted digital image color matching, implemented with a computing device shown as a portable tablet device 102 that executes a color editing system 104 as a software application, or as a module of a software application, on a processor or processing system of the computing device. As detailed in the device description of the example device shown in FIG. 4, the tablet device 102 can display a color editing user interface 106 of a computer application implemented by the computing device. For example, many different types of computer applications implement features or functions that provide for graphic design, publication development, artistic creations, digital photo enhancement, digital video frame enhancement, and the like.

In this example, a user of the tablet device 102 can select an input image 108 that has color features the user wants to visually enhance by color matching. The user can also select any reference image 110 that has the overall color features, style, and brightness to transfer or apply to the selected input image for the color matching. Generally, color matching is described herein as applying or transferring the color features, style, and brightness of the reference image to the input image 108 to generate or create a modified image 112 that has enhanced color and brightness features. The input image 108 can be selected from any digital image that is accessible via the computing device, such as a digital video frame from a video clip, a digital photo that has been captured with a camera device and stored in a photo collection on the tablet device 102, or a digital image that is accessible from cloud storage via a network connection with the tablet device. Similarly, the reference image 110 can be selected as any other video frame, digital photo, or digital image, such as may be stored on the tablet device, accessible from cloud storage, downloaded from the Internet, and the like.

In some instances, the image content of an input image 108 and a selected reference image 110 can be the same, such as two photos or video frames of the same scene or persons, and the color features, style, and/or brightness of one of the images is transferred to the other to compensate for the color differences between the two images. It should be noted, however, that the image content of the reference image 110 can be different content than in the input image 108, where the different image content provides an example of the color features, style, and brightness to transfer or apply to the input image. In this example 100, the image content of the input image 108 depicts a person in a very light-colored room with several bright, natural-light windows, whereas the image content of the reference image 110 depicts three people standing in a relatively darker-colored room. The user may select the reference image 110 that has an overall darker appearance to enhance or darken the very bright image content of the input image 108, such as to tone down the very bright, natural-light windows. As shown in the example, the modified image 112 is displayed on the tablet device 102 as a representation of the input image 108 with improved color features derived from the color features of the reference image, particularly with the glare from the very bright, natural-light windows having been toned down.

Figure 4:
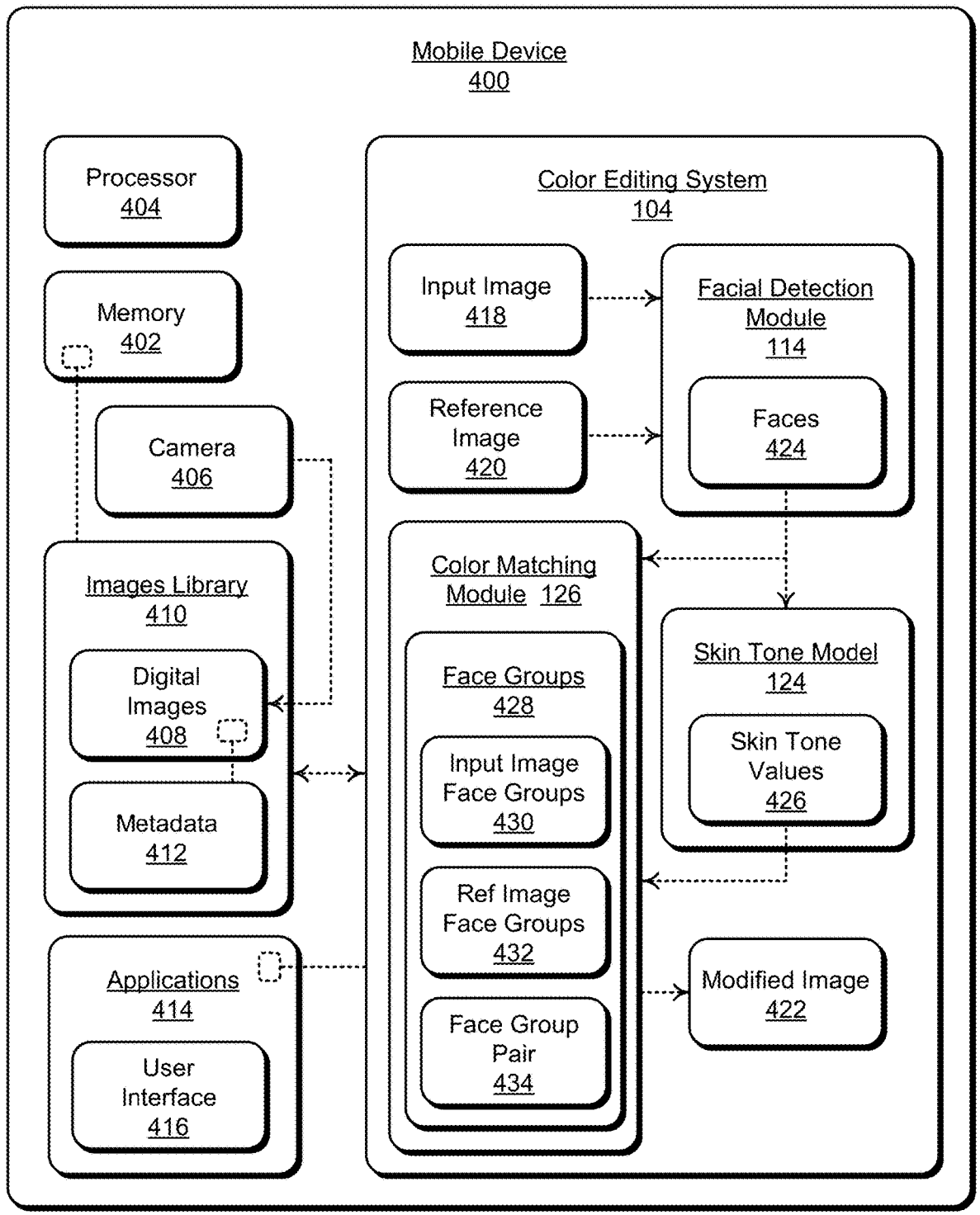
FIG. 4 illustrates an example device in which aspects of skin tone assisted digital image color matching can be implemented.

In embodiments, and as further detailed in the device description of the example device shown in FIG. 4, the tablet device 102 implements the color editing system 104 (e.g., as a module, a component, a software application, etc.). The color editing system 104 can receive a selection of the input image 108, such as selected by the user of the computing device. Similarly, the color editing system 104 can receive a selection of the reference image 110 that includes an example of the color features, style, and/or brightness to be applied to the input image 108 for color matching. The color editing system 104 includes a facial detection module 114 that can detect faces in the input image 108 and in the reference image 110.

In implementations, the facial detection module 114 can utilize any known technique, or a combination of known, different techniques for facial detection of a face in an image based on the detectable features, commonly referred to as facial landmarks or nodal points that include measurable distances between facial features, such as around the eyes, nose, mouth, cheeks, etc. Conventional techniques are available as open source code that can be implemented for face detection in an image, such as in a digital photo or a video frame. For example, the OpenCV (open source computer vision) library has open source code for detecting faces in images using Haar feature-based cascade classifiers, implemented as a machine learning based approach to face detection.

In implementations of skin tone assisted digital image color matching as described herein, the facial detection module 114 is utilized to detect the occurrence of faces in the input images and in the reference images, rather than for full recognition and identification of a particular person depicted in an image. For example, image regions of the input image 108 can be determined by the facial detection module 114 as including a face, such as the image region 116 in the input image identified as the blue square that approximately encompasses the face of the person. Similarly, image regions of the reference image 110 can be determined by the facial detection module 114 as including a face, such as the image regions 118, 120, and 122 in the reference image identified as the blue squares approximately encompassing the faces of the people in the image.

As described herein, the image regions of the various images that are determined to include a face of a person, which are identified as the blue or green squares that approximately encompass the face of a person, generally include the pixels of the image that are likely the most accurate representation of the skin tone of the person. For example, the cheeks of a person's face, as well as the forehead area below the hairline down to just below the nose are the areas of one's face that will likely be the most accurate representation of skin tone, while excluding the color of one's hair and/or beard that is likely a different color and would alter the perceived skin tone.

The color editing system 104 also includes a skin tone model 124 designed to determine a skin tone value reflective of the skin tone of each of the faces that are detected by the facial detection module 114 in the input image 108 and/or in the reference image 110. As described in more detail with reference to the example device shown in FIG. 4, the skin tone model 124 can be implemented using machine learning, such as a convolutional neural network that is trained to determine skin tone values of the faces based on skin tone identifiers and varying lighting features that may alter the skin tone appearance of the faces in the images. Although the human eye can naturally detect skin tones and distinctions in digital images that may be caused by shadows and various lighting features, such as natural lighting or indoor illumination, conventional computing device applications simply determine color based on pixel values in an image region that includes a face in the image. Accordingly, the convolutional neural network is trained with labeled skin tone values, and is designed to take into account varying levels of brightness transforms that may affect the appearance of skin tones in the faces detected in the input image 108 and in the reference image 110.

The color editing system 104 also includes a color matching module 126 to implement aspects of skin tone assisted digital image color matching as described herein. The color matching module 126 can group the faces detected in each of the input image 108 and the reference image 110 into one or more face groups based on the skin tone value of each of the faces, as determined by the skin tone model 124. The faces detected in the input image 108 by the facial detection module 114 are the input image faces that may be grouped into one or more input image face groups. In this example 100, the color matching module 126 would only generate one input image face group, which includes the face of the person corresponding to the image region 116 in the input image 108. For an input image that includes more than one face shown in the image, an input image face group includes one or more of the input image faces having skin tone value differences less than or equal to a grouping threshold so that the faces included in a particular input image face group have a similar skin tone and appearance.

Similarly, the faces detected in the reference image 110 by the facial detection module 114 are the reference image faces that may be grouped into one or more reference image face groups. In this example 100, the color matching module 126 would generate two reference image face groups, where a reference image face group includes one or more of the reference image faces having skin tone value differences less than or equal to the grouping threshold. For example, the color matching module 126 would generate a first reference image face group, which includes the face of the person corresponding to the image region 118 in the reference image 110. The color matching module 126 would also generate a second reference image face group, which includes the faces of the people corresponding to the image regions 120, 122 in the reference image.

Notably, the faces included in the second reference image face group (i.e., the faces in the image regions 120, 122) have a similar skin tone and appearance, and have a skin tone value difference less than or equal to the grouping threshold. In implementations, the grouping threshold may be set at a common value of one (1.0) so that faces having similar skin tone values, which can range from zero to ten (0-10), may be grouped together. For example, the face of the lady in the image region 120 in the reference image 110 may have a skin tone value of S1 and the face of the man in the image region 122 in the reference image may have a skin tone value of S2. The two faces can be grouped together in the second reference image face group if their skin tone value difference ($|S1-S2|$)<=1.0 (less than or equal to the grouping threshold).

The color matching module 126 can also calculate an average skin tone value from the skin tone values of the respective faces in each of the one or more input image face groups and in each of the one or more reference image face groups. The average skin tone values of the respective face groups can be used to correlate group matching of an input image face group paired with a reference image face group. To match the face group pair, the color matching module 126 identifies input image regions of the input image and reference image regions of the reference image that include the faces detected by the facial detection module 114 in the images. The color matching module 126 can determine the face group pair based on a matching criteria of the face group pair having a difference of the respective average skin tone values being less than or equal to a matching threshold.

The color matching module 126 can calculate area sums of the input image regions and the reference image regions corresponding to the faces grouped in the respective input image face groups and the respective reference image face groups. The area sum of an image face group is calculated as: Area Sum=$(\Sigma_{k=1}^{n} A_k)$, where n is the number of faces in an image face group (e.g., in an input image face group or in a reference image face group), and $A_k$ is the area of the $k^{th}$ face of the group. The color matching module 126 can then match the face group pair as the input image face group having the largest possible area sum of the input image regions that meets the matching criteria and the reference image face group having the largest possible area sum of the reference image regions that meets the matching criteria, which as noted above is the face group pair having a difference of the respective average skin tone values being less than or equal to the matching threshold.

Accordingly, the group matching to determine the face group pair is an iterative process to find the largest possible matching input image and reference image face groups having a maximum area sum, and with an average skin tone value difference less than or equal to the matching threshold. In implementations, the matching threshold may be set at a value of two (2.0) so that faces of the input image face group and the reference image face group have similar skin tone values. For example, the input image face group having the largest possible area of input image regions that include faces in the input image 108 is paired with the reference image face group having the largest possible area of reference image regions that include faces in the reference image 110, and the difference between the respective average skin tone values of the two image face groups is less than or equal to a matching threshold.

In this example 100, the one input image face group, which includes the face of the person corresponding to the image region 116 in the input image 108, is paired with the first reference image face group, which includes the face of the person corresponding to the image region 118 in the reference image 110 due to the similarity in skin tone values and based on the difference between the respective average skin tone values of the two image face groups being less than or equal to the matching threshold. The face group pair that has been matched is identified as the green squares that approximately encompass the image regions in each of the input image 108 and in the reference image 110 that include the faces having the similar skin tone values, and the difference between the respective average skin tone values of the two image face groups being less than or equal to the matching threshold. Notably, the second reference image face group, which includes the faces of the people corresponding to the image regions 120, 122 in the reference image 110, would have the larger area of reference image regions that include faces in the reference image. However, the average skin tone difference between the one input image face group and the second reference image face group would exceed the matching threshold.

The color matching module 126 of the color editing system 104 can then generate the modified image 112 from the input image 108 based on the color features of the reference image 110, where the color features can include using the face skin tones of the respective faces in the face group pair as part of the color features applied to modify the input image. In this example 100, the glare from the very bright, natural-light windows shown in the input image 108 has been toned down in the modified image 112. In implementations, the color matching module generates the modified image 112 utilizing the midtone color features of the reference image 110 applied to the input image 108, where the face skin tones in the face group pair can be used as part of the midtone color features for the color matching. Notably, the skin tones of people are predominately midtone colors having an effect on the midtone colors and brightness when color matching images.

The color matching using the midtone color features of the reference image 110 applied to the input image 108, based on the similar average skin tone values of the face group pair, is effective to maintain the original captured image color of the faces in the input image. For example, by using the reference image face group, which includes the face of the person corresponding to the image region 118 in the reference image 110, the skin tone of the person in the input image 108, as originally captured in the input image, is not altered (e.g., is not changed to a lighter or darker skin tone) in the modified image 112. Given that people are generally sensitive to changes in the appearance of their skin tone in digital images and/or in video frames in a video clip, for example, the color editing system 104 can determine whether or not to use face skin tones of the respective faces in the face group pair of the input image face group and the reference image face group as part of the color features applied to modify the input image.

As described in more detail below, the color matching module 126 of the color editing system 104 may also determine not to use the image regions that include the faces in an input image and in a reference image for color matching. For example, if the average skin tone difference between the input image face group and the reference image face group exceeds the matching threshold for face group matching, the image regions that include the faces may not be used for the color matching so as not to alter the appearance of the skin tone of persons in the input image when the color features, style, and/or brightness of the reference image are applied to the input image.

Figure 2:
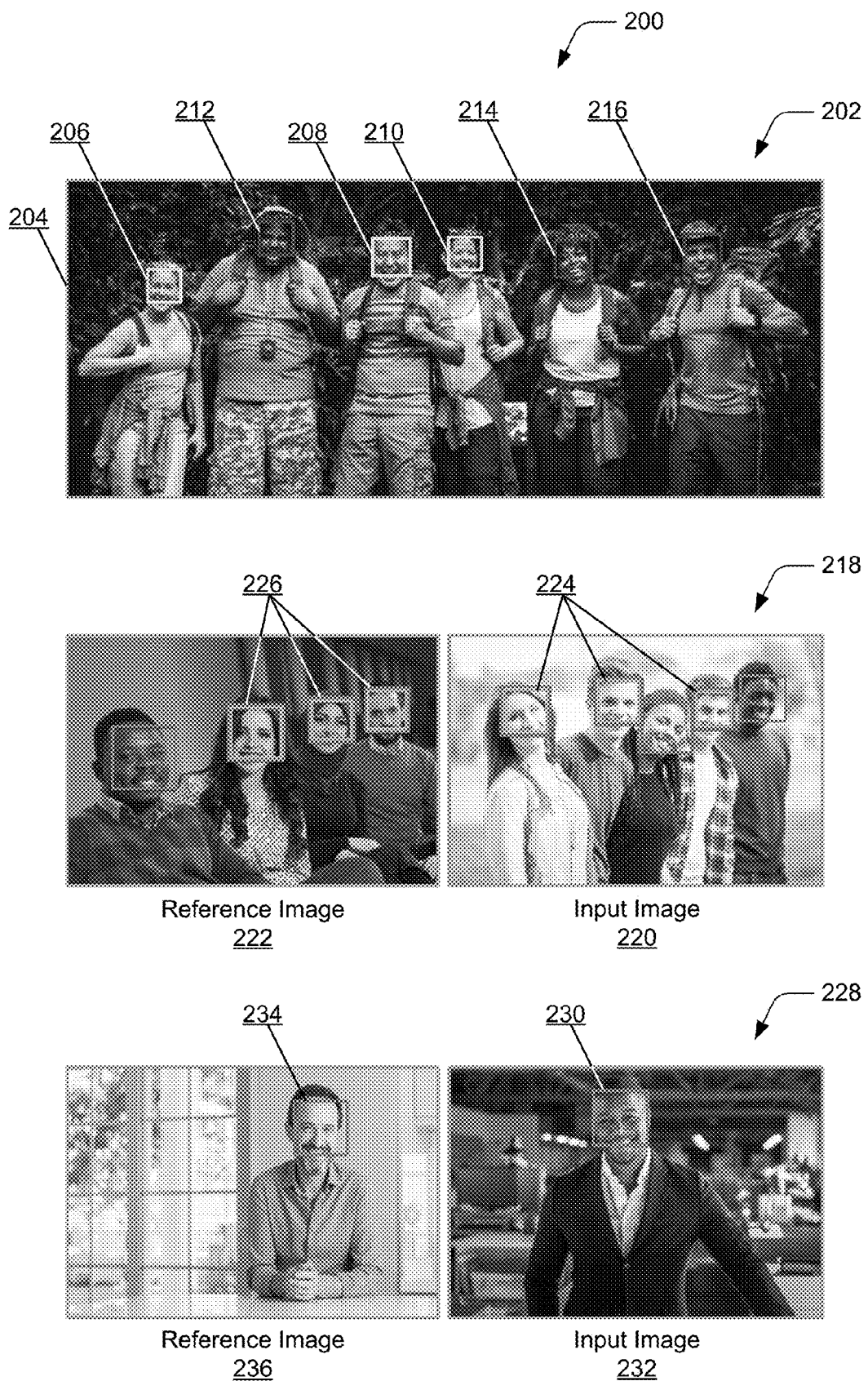
FIG. 2 further illustrates example aspects of skin tone assisted digital image color matching in accordance with one or more implementations.

FIG. 2 further illustrates example aspects 200 of skin tone assisted digital image color matching in accordance with one or more implementations. As noted above, the color matching module 126 of the color editing system 104 can group the faces in the input and reference images into one or more face groups based on the skin tone value of each of the faces, as determined by the skin tone model 124. In the example 202, the faces detected in an image 204 by the facial detection module 114 are the image faces that may be grouped into one or more image face groups. In this example, the color matching module 126 would generate two image face groups that each include one or more of the image faces having skin tone value differences less than or equal to the grouping threshold.

For example, the color matching module 126 would generate a first image face group, which includes the faces corresponding to the image regions 206, 208, 210 in the image 204 identified as the yellow squares approximately encompassing the respective faces of the people depicted in the image. The color matching module 126 would also generate a second image face group, which includes the faces corresponding to the image regions 212, 214, and 216 in the image 204 identified as the red squares approximately encompassing the respective faces of the people depicted in the image. In implementations, the grouping threshold may be set at a value of one (1.0) so that faces having similar skin tone values may be grouped together, where the faces are grouped together if their skin tone value difference (|S1−S2|)<=1.0 (less than or equal to the grouping threshold).

The color matching module 126 of the color editing system 104 can also match a face group pair as an input image face group paired with a reference image face group. In the example 218, the color matching module 126 identifies input image regions of an input image 220 and reference image regions of a reference image 222 that include the faces detected by the facial detection module 114 in the images. The color matching module 126 can calculate area sums of the input image regions and the reference image regions corresponding to the faces grouped in the respective input image face groups and the respective reference image face groups. The color matching module 126 can determine the face group pair based on a matching criteria of the face group pair having a difference of the respective average skin tone values being less than or equal to a matching threshold. The color matching module 126 can then match the face group pair as the input image face group having the largest possible area sum of the input image regions that meets the matching criteria and the reference image face group having the largest possible area sum of the reference image regions that meets the matching criteria, which is the face group pair having a difference of the respective average skin tone values being less than or equal to the matching threshold.

Accordingly, the group matching to determine the face group pair is an iterative process to find the largest possible matching input image and reference image face groups having a maximum area sum, and with an average skin tone value difference less than or equal to the matching threshold. For example, the input image face group having the largest possible area of input image regions that include faces in the input image 220 is paired with the reference image face group having the largest possible area of reference image regions that include faces in the reference image 222, and the difference between the respective average skin tone values of the two image face groups is less than or equal to the matching threshold.

In this example 218, an input image face group 224 includes the relatively lighter skin tone faces of the people identified by the green squares approximately encompassing the image regions in the input image 220. The input image face group 224 is the largest area sum of image regions that include faces in the input image 220 (e.g., includes three of the five image face regions), and is also the largest possible area sum of image regions in the input image 220 that matches a reference image face group. The input image face group 224 is paired with a reference image face group 226 that also includes the relatively lighter skin tone faces of the people identified by the green squares approximately encompassing the image regions in the reference image 222. The reference image face group 226 is the largest area sum of image regions that include faces in the reference image 222 (e.g., includes three of the four image face regions), and is also the largest possible area sum of image regions in the reference image 222 that matches the input image face group. The face group pair that has been matched includes the faces having similar skin tone values, is the best face group matching between the two images, and the difference between the respective average skin tone values of the two image face groups is less than or equal to the matching threshold.

In an example 228, the color matching module 126 of the color editing system 104 would create an input image face group that includes the image region 230 of the face in an input image 232. Similarly, the color matching module 126 would create a reference image face group that includes the image region 234 of the face in a reference image 236. Given that the skin tones of the faces in the two images are substantially different, where the difference between the respective average skin tone values of the input image face group and the reference image face group exceeds the matching threshold for face group matching, the color matching module 126 would not use the image regions 230, 234 for midtone color matching so as not to alter the appearance of the skin tone of the person in the input image 232 when the color features of the reference image 236 are applied to the input image.

Figure 3:
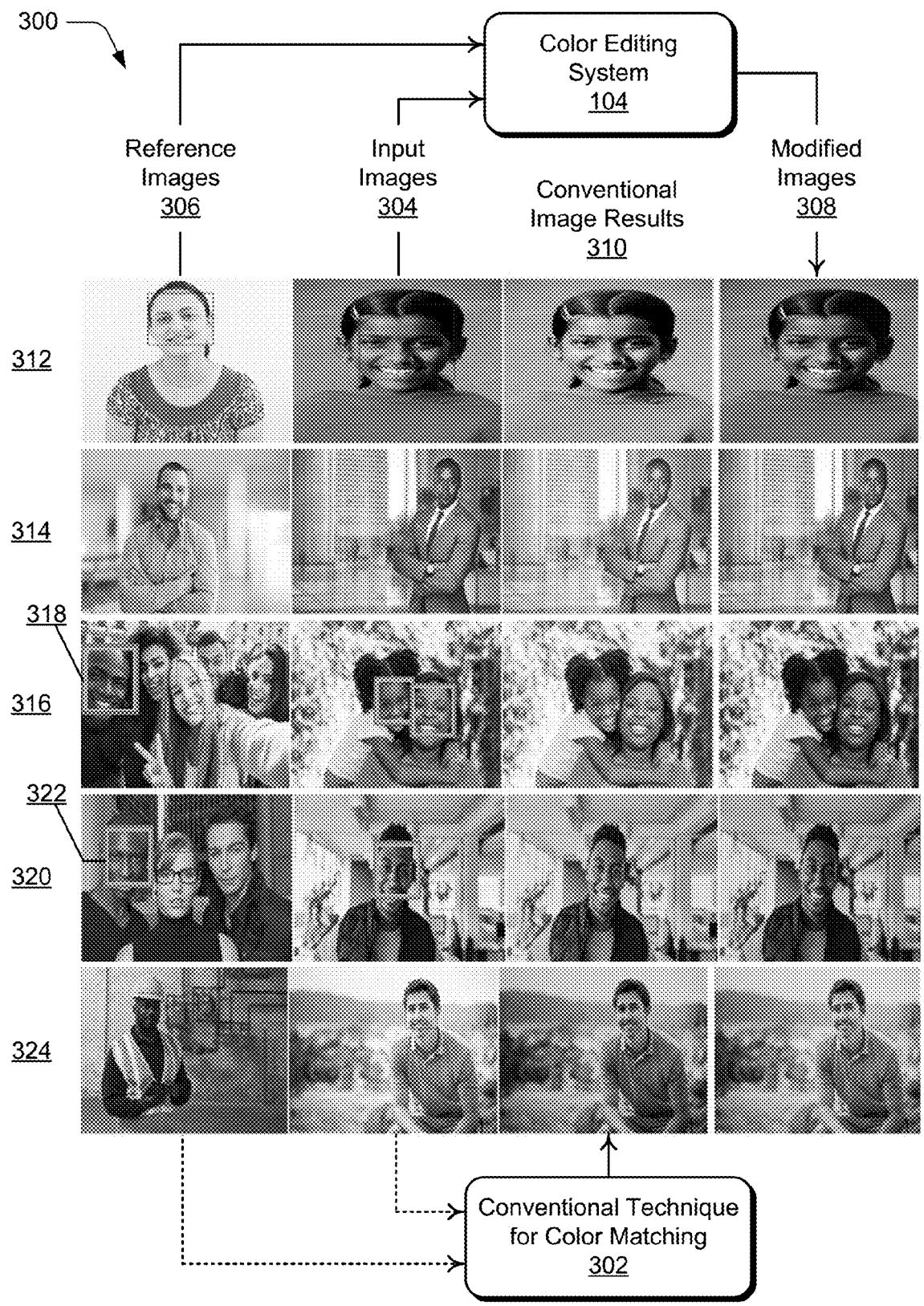
FIG. 3 further illustrates examples of skin tone assisted digital image color matching in accordance with one or more implementations.

FIG. 3 further illustrates examples 300 of skin tone assisted digital image color matching as implemented by the color editing system 104 shown and described with reference to FIG. 1. For discussion purposes, the examples 300 also illustrate a comparison of the quality of a conventional technique 302 for color matching. In these illustrated examples, the color editing system 104 can receive an input image 304 that a user wants to visually enhance by color matching. The user can also select any reference image 306 that has the overall color features, style, and/or brightness to transfer or apply to the selected input image 304 for the color matching.

The color editing system 104 can then generate a modified image 308 from the input image 304 based on the color features of the reference image 306, where the color features can include using the face skin tones of the respective faces in a face group pair as part of the color features applied to modify the input image, as generally described with reference to FIGS. 1 and 2. The color matching module 126 of the color editing system 104 is designed to generate the modified image 308 so as not to alter the appearance of the skin tone of persons in the input image 304 when the color features of the reference image 306 are applied to the input image. Five different examples of a respective input image 304, reference image 306, and resulting modified image 308 are shown across five rows in the illustrated examples 300.

The results of a conventional technique 302 for color matching are also shown for comparison in the five rows of the illustrated examples 300. Conventional image results 310 are shown for techniques that suffer from altered skin tones of faces in the original input image 304 when color matching using the midtone facial skin tones from a reference image 306, where the average skin tone difference between faces in the two images is substantially different.

In the first row 312 of example images, the skin tone of the lady in the reference image 306 is significantly lighter than the skin tone of the girl in the input image 304. The skin tone values that are reflective of the skin tone of each of the faces in the input image 304 and in the reference image 306 would indicate enough of a difference in skin tones that the color matching module 126 of the color editing system 104 would not apply the midtone colors of the image region that includes the face of the lady in the reference image 306 to modify the input image 304 for color matching (e.g., the average skin tone difference between faces in the two images is substantially different).

Accordingly, the modified image 308 in the first row 312 of the example images may have a lighter or brighter background when the color matching module 126 applies the color features of the reference image 306 to the input image 304 for color matching, but the original skin tone appearance of the face of the girl in the input image is not altered when generating the modified image. In contrast, the conventional technique 302 for color matching would apply all of the color features of the reference image 306 to the input image 304 for color matching, including the relatively lighter skin tone of the face of the lady in the reference image. The conventional image result 310 in the first row 312 of example images illustrates how the skin tone of the face of the girl is altered to a significantly lighter skin tone, which is not representative of the original skin tone of the girl as depicted in the input image 304, and the result is not a realistic appearance of the girl's skin tone.

Similarly in the second row 314 of example images, the skin tone of the man in the reference image 306 is significantly lighter than the skin tone of the man in the input image 304. The skin tone values that are reflective of the skin tone of each of the faces in the input image 304 and in the reference image 306 would indicate enough of a difference in skin tones that the color matching module 126 of the color editing system 104 would not apply the midtone colors of the image region that includes the lighter skin tone face of the man in the reference image 306 to modify the input image 304 for color matching (e.g., the average skin tone difference between faces in the two images is substantially different).

Accordingly, the modified image 308 in the second row 314 of the example images has a lighter or brighter background when the color matching module 126 applies the color features of the reference image 306 to the input image 304 for color matching, but the original skin tone appearance of the face of the man in the input image is not altered when generating the modified image. In contrast, the conventional technique 302 for color matching would apply all of the color features of the reference image 306 to the input image 304 for color matching, including the relatively lighter skin tone of the face of the man in the reference image. The conventional image result 310 in the second row 314 of example images illustrates how the relatively darker skin tone of the face of the man is altered to a significantly lighter skin tone, which is not representative of the original skin tone of the man as depicted in the input image 304, and the result is not a realistic appearance of the man's skin tone.

In the third row 316 of example images, the facial detection module 114 of the color editing system 104 can detect the faces in the input image 304 and in the reference image 306, and the skin tone model 124 determines a skin tone value reflective of the skin tone of each of the faces that are detected by the facial detection module. The color matching module 126 of the color editing system 104 can then group the faces of the lady and the girl in the input image 304 into an input image face group, where the skin tone value difference of the two faces in the input image is less than or equal to the grouping threshold, indicating that the two faces in the input image face group have a similar skin tone and appearance.

Further, the color matching module 126 would generate two reference image face groups from the faces detected in the reference image 306 by the facial detection module 114. For example, the color matching module 126 would generate a first reference image face group, which includes the face of the person with the relatively darker skin tone corresponding to the image region 318 in the reference image 306. The color matching module 126 would also generate a second reference image face group, which includes the faces of the other people with the relatively lighter skin tone faces in the reference image. The color matching module 126 can then use the average skin tone values of the respective face groups to correlate group matching of an input image face group paired with a reference image face group. In this example, the color matching module 126 determines a face group pair as the input image face group that includes the faces of the lady and the girl in the input image 304 paired with the first reference image face group that includes the face of the person corresponding to the image region 318 in the reference image 306. The face group pair that has been matched is identified as the green squares approximately encompassing the image regions in each of the input image 304 and in the reference image 306 that include the faces having similar skin tone values, and the difference between the respective average skin tone values of the two image face groups is less than or equal to the matching threshold.

The color matching module 126 of the color editing system 104 can then generate the modified image 308 from the input image 304 based on the color features of the reference image 306, where the color features include using the face skin tone of the image region 318 in the reference image 306 as part of the color features applied to modify the input image. Accordingly, the modified image 308 in the third row 316 of the example images has a slightly darker background when the color matching module 126 applies the color features of the reference image 306 to the input image 304 for color matching. Notably, the original skin tone appearance of the faces of the lady and the girl in the input image is not altered when generating the modified image. In contrast, the conventional technique 302 for color matching would apply all of the color features of the reference image 306 to the input image 304 for color matching, including the relatively lighter skin tones of the faces of the other four people in the reference image. The conventional image result 310 in the third row 316 of example images illustrates how the faces of the lady and the girl are washed out and altered to a lighter skin tone, which is not representative of their original skin tones as depicted in the input image 304, and the result is not a realistic appearance of their faces.

In the fourth row 320 of example images, the facial detection module 114 of the color editing system 104 can detect the faces in the input image 304 and in the reference image 306, and the skin tone model 124 determines a skin tone value reflective of the skin tone of each of the faces that are detected by the facial detection module. The color matching module 126 of the color editing system 104 can then group the face of the man in the input image 304 into an input image face group.

Further, the color matching module 126 would generate two reference image face groups from the faces detected in the reference image 306 by the facial detection module 114. For example, the color matching module 126 would generate a first reference image face group, which includes the face of the person with the relatively darker skin tone corresponding to the image region 322 in the reference image 306. The color matching module 126 would also generate a second reference image face group, which includes the faces of the two other people with the relatively lighter skin tone faces in the reference image. The color matching module 126 can then use the average skin tone values of the respective face groups to correlate group matching of an input image face group paired with a reference image face group. In this example, the color matching module 126 determines a face group pair as the input image face group that includes the face of the man in the input image 304 paired with the first reference image face group that includes the face of the person corresponding to the image region 322 in the reference image 306. The face group pair that has been matched is identified as the green squares approximately encompassing the image regions in each of the input image 304 and in the reference image 306 that include the faces having similar skin tone values, and the difference between the respective average skin tone values of the two image face groups is less than or equal to the matching threshold.

The color matching module 126 of the color editing system 104 can then generate the modified image 308 from the input image 304 based on the color features of the reference image 306, where the color features include using the face skin tone of the image region 322 in the reference image 306 as part of the color features applied to modify the input image. Accordingly, the modified image 308 in the third row 316 of the example images has a slightly darker background when the color matching module 126 applies the color features of the reference image 306 to the input image 304 for color matching. Notably, the original skin tone appearance of the face of the man in the input image is not altered when generating the modified image. In contrast, the conventional technique 302 for color matching would apply all of the color features of the reference image 306 to the input image 304 for color matching, including the relatively lighter skin tones of the faces of the other two people in the reference image. The conventional image result 310 in the fourth row 320 of example images illustrates how the face of the man is altered to a lighter skin tone, which is not representative of his original skin tone as depicted in the input image 304, and the result is not a realistic appearance of his face.

In the fifth row 324 of example images, the skin tone of the man in the reference image 306 is significantly darker than the skin tone of the man in the input image 304. The skin tone values that are reflective of the skin tone of each of the faces in the input image 304 and in the reference image 306 would indicate enough of a difference in skin tones that the color matching module 126 of the color editing system 104 would not apply the midtone colors of the image region that includes the darker skin tone face of the man in the reference image 306 to modify the input image 304 for color matching (e.g., the average skin tone difference between faces in the two images is substantially different).

Accordingly, the modified image 308 in the fifth row 324 of the example images has a bit darker background when the color matching module 126 applies the color features of the reference image 306 to the input image 304 for color matching, but the original skin tone appearance of the face of the man in the input image is not altered when generating the modified image. In contrast, the conventional technique 302 for color matching would apply all of the color features of the reference image 306 to the input image 304 for color matching, including the relatively darker skin tone of the face of the man in the reference image. The conventional image result 310 in the fifth row 324 of example images illustrates how the relatively lighter skin tone of the face of the man is altered to a significantly darker skin tone, which is not representative of the original skin tone of the man as depicted in the input image 304, and the result is not a realistic appearance of the man's skin tone.

FIG. 4 illustrates an example mobile device 400, such as a mobile phone or smartphone, in which aspects of skin tone assisted digital image color matching can be implemented. The mobile device 400 can be implemented as any type of computing device, client device, mobile phone, tablet device, communication, entertainment, gaming, media playback, and/or other type of electronic and/or computing device. Additionally, the mobile device 400 may include any number and combination of different components as further described with reference to the example device shown in FIG. 10, such as memory 402 and a processor 404, as well as a camera 406 to capture digital images 408 as digital photos or digital video frames. The digital images 408 can include any of the input images and reference images described herein, and includes any type of digital image that is accessible via the mobile device 400, such as a digital video frame from a video clip, a digital photo captured with the camera 406 and stored in an images library 410 on the mobile device, or a digital image that is accessible from cloud storage via a network connection with the mobile device.

The memory 402 can be used to maintain the digital images 408 in the images library 410, as well as metadata 412 that is associated with the digital images. Generally, the metadata 412 associated with a digital image 408 is information that provides context about the digital image. The metadata 412 of a digital image 408 is information that can be stored and communicated with an image file of a digital image. The metadata 412 may include descriptive information about a digital image 408 added by a user of the mobile device, such as by the person who captured a photo or video. The metadata 412 can also include information that is added to an image file based on automated capture with the camera 406, such as an identifier of a digital image, the date and time of day the image is captured, a geolocation of where the image is captured, dimensions and photographic properties of the image (e.g., lens aperture, focal length, shutter speed, lighting, etc.), a stored location of the image, keywords that identify content captured in the digital image, rights management information (e.g., copyright and access), and/or any other type of information about a digital image.

The mobile device 400 implements the color editing system 104, such as in software, in hardware, or as a combination of software and hardware components. The color editing system 104 can be implemented as a software application or module, such as executable software instructions (e.g., computer-executable instructions) that are executable with a processing system (e.g., the processor 404) of the mobile device 400 to implement the techniques of skin tone assisted digital image color matching. The color editing system 104 can be stored on computer-readable storage media, such as any suitable memory device (e.g., the device memory 402) or other electronic data storage implemented in the mobile device. Additionally, the color editing system 104 includes the facial detection module 114, the skin tone model 124, and the color matching module 126, each of which may be implemented as an independent or integrated module of the color editing system. Further, although the modules and/or models described herein for skin tone assisted digital image color matching are described with certain functionality, other combinations and sub-combinations of elements, functions, and features are contemplated.

In this example, the mobile device 400 includes applications 414, such as applications that have been downloaded to the mobile device, and the color editing system 104 can be implemented as a module or software component of one or more of the device applications 414. In implementations, one or more of the device applications 414 may implement features or functions that provide for graphic design, publication development, artistic creations, digital photo enhancement, digital video frame enhancement, and the like. In aspects of skin tone assisted digital image color matching as described herein, the user of the mobile device 400 can select an input image 418 via the user interface 416, where the input image has color features the user wants to visually enhance by color matching. The user can also select any reference image 420 via the user interface 416, where the reference image has the overall color features, style, and/or brightness to transfer or apply to the selected input image 418 for the color matching. Generally, color matching is described herein as applying or transferring the color features of the reference image 420 to the input image 418 to generate or create a modified image 422 that has enhanced color and brightness features.

The facial detection module 114 of the color editing system 104 can be implemented in the mobile device 400 to detect faces 424 in the input image 418 and in the reference image 420. Although, facial recognition technology is designed to identify or verify a person from a digital image, the facial detection module 114 as described herein is utilized to a lesser degree to detect the occurrence of faces in image regions of the input image 418 and in image regions of the reference image 420, rather than for full recognition and identification of a particular person depicted in the images.

The skin tone model 124 of the color editing system 104 can be implemented in the mobile device 400 as a trained convolutional neural network designed to determine a skin tone value 426 reflective of the skin tone of each of the faces 424 that are detected by the facial detection module 114 in the input image 418 and/or in the reference image 420. The skin tone model 124 can be implemented using machine learning, such as a convolutional neural network that is trained to determine the skin tone values 426 of the faces 424 based on skin tone identifiers (e.g., labeled skin tone values) and varying lighting features that may alter the skin tone appearance of the faces 424 in the input and reference images. The skin tone model 124 is also trained to take into account varying levels of brightness transforms that may affect the appearance of skin tones in the faces 424 detected in the input image 418 and in the reference image 420. The skin tone model 124 can correctly determine skin tones even in images having a strong color cast due to lighting conditions captured in a digital image or digital video frame.

In implementations, the skin tone model 124 is a convolutional neural network trained on a dataset of sampled images with a cloud-based server device, and then the model can be downloaded for use on a mobile device or other user computing device, as shown and described with reference to FIG. 5. The training dataset is augmented for different color and brightness transforms so that the model is robust enough to correctly determine skin tone in images having different lighting conditions. The neural network takes into account lighting and shadows that may have an effect on skin tones, and the neural network can also be augmented to be more robust for determining the skin tone of faces with a beard, a moustache, and/or sun glasses. The skin tone model 124 can be trained based on neural networks such as SqueezeNet or MobileNet, which are implemented as smaller neural networks for computer vision using fewer parameters (e.g., 5 MB of parameters), yet provide the accuracy of AlexNet as a deep neural network having significantly more parameters (e.g., 240 MB of parameters). Thus, the skin tone model 124 is relatively small in size and trains faster than other conventional deep neural networks. The small model size allows the skin tone model 124 to be ported onto a mobile device platform.

Generally, the skin tone model 124 can be implemented as manually created rule sets, or may be automatically learned over time, such as by using machine learning and/or training a neural network. The skin tone model 124 can be implemented as any type of machine learning or neural network with trained classifiers, such as in software and/or in hardware in any type of computing device. The machine learning can be implemented as any type of a neural network or machine learning model, referring to a computer representation that can be tuned or trained based on inputs to approximate unknown functions. In particular, the term "machine learning model" can include a model that utilizes algorithms to learn from, and make predictions on, known data by analyzing the known data to learn to generate outputs that reflect patterns and attributes of the known data. For instance, a machine-learning model can include but is not limited to, decision trees, support vector machines, linear regression, logistic regression, Bayesian networks, random forest learning, dimensionality reduction algorithms, boosting algorithms, artificial neural networks, deep learning, and the like. Thus, a machine-learning model makes high-level abstractions in data by generating data-driven predictions or decisions from the known input data.

The color matching module 126 of the color editing system 104 can be implemented in the mobile device 400 to group the faces detected in the input image 418 and in the reference image 420 into one or more face groups 428 based on the skin tone value of each of the faces, as determined by the skin tone model 124. The faces detected in the input image 418 by the facial detection module 114 are the input image faces that may be grouped into one or more input image face groups 430. Similarly, the faces 424 detected in the reference image 420 by the facial detection module 114 are the reference image faces that may be grouped into one or more reference image face groups 432. Generally, the faces 424 included in a face group 428 have a similar skin tone and appearance, and have a skin tone value difference less than or equal to a grouping threshold. In implementations, the grouping threshold may be set at a value of one (1.0) so that faces 424 having similar skin tone values can be grouped together.

The color matching module 126 can also then calculate an average skin tone value from the skin tone values of the respective faces in each of the one or more input image face groups 430 and in each of the one or more reference image face groups 432. The average skin tone values of the respective face groups can be used to correlate group matching of an input image face group 430 paired with a reference image face group 432. In implementations, the color matching module 126 can match the face group pair 434 as an input image face group 430 paired with a reference image face group 432. To match the face group pair 434, the color matching module 126 identifies input image regions of the input image 418 and reference image regions of the reference image 420 that include the faces 424 detected by the facial detection module 114 in the images. The color matching module 126 can determine the face group pair 434 based on a matching criteria of the face group pair having a difference of the respective average skin tone values being less than or equal to a matching threshold.

The color matching module 126 can calculate area sums of the input image regions and the reference image regions corresponding to the faces 424 that are grouped in the respective input image face groups 430 and in the respective reference image face groups 432. The area sum of an image face group is calculated as: Area Sum=$(\Sigma_{k=1}^{n} A_k)$, where n is the number of faces in an image face group (e.g., in an input image face group 430 or in a reference image face group 432), and $A_k$ is the area of the $k^{th}$ face of the group. The color matching module 126 can then match the face group pair 434 as the input image face group 430 having the largest possible area sum of the input image regions that meets the matching criteria and the reference image face group 432 having the largest possible area sum of the reference image regions that meets the matching criteria, which as noted above is the face group pair 434 having a difference of the respective average skin tone values being less than or equal to the matching threshold. Accordingly, the group matching to determine the face group pair is an iterative process to find the largest possible matching input image and reference image face groups having a maximum area sum, and with an average skin tone value difference less than or equal to the matching threshold.

The color matching module 126 of the color editing system 104 can then generate the modified image 422 from the input image 418 based on the color features of the reference image 420, where the color features can include using the face skin tones of the respective faces in the face group pair 434 as part of the color features applied to modify the input image. Specifically, the pixel color values of the pixels in the image regions represent the face skin tones of the respective faces in a face group pair. The pixel color values (in one or more of the various color spaces) can be used by the color matching module 126 as part of the color features used to modify the input image, such as with known color-matching techniques implemented in image and video editing applications like Adobe Photoshop® and Lightroom® for digital image creation and editing, or Adobe Premier Pro® for video editing. For example, Adobe Photoshop® provides a "Match Color" command as a user-selectable tool that initiates a user interface of a color matching algorithm to match colors between images and adjust several color image features, such as luminance, color range, color intensity, contrast, and other features working in the RGB (red, green, and blue) color space.

Alternatively, the color matching module 126 of the color editing system 104 may determine not to use the pixel color values from the image regions that include the faces in an input image and/or in a reference image for color matching. For example, if the average skin tone difference between the input image face group 430 and the reference image face group 432 exceeds the matching threshold for face group matching, the pixel color values of the pixels in the image regions that include the faces 424 may not be used for the color matching so as not to alter the appearance of the skin tone of persons in the input image 418 when the color features of the reference image 420 are applied to the input image.

Figure 5:
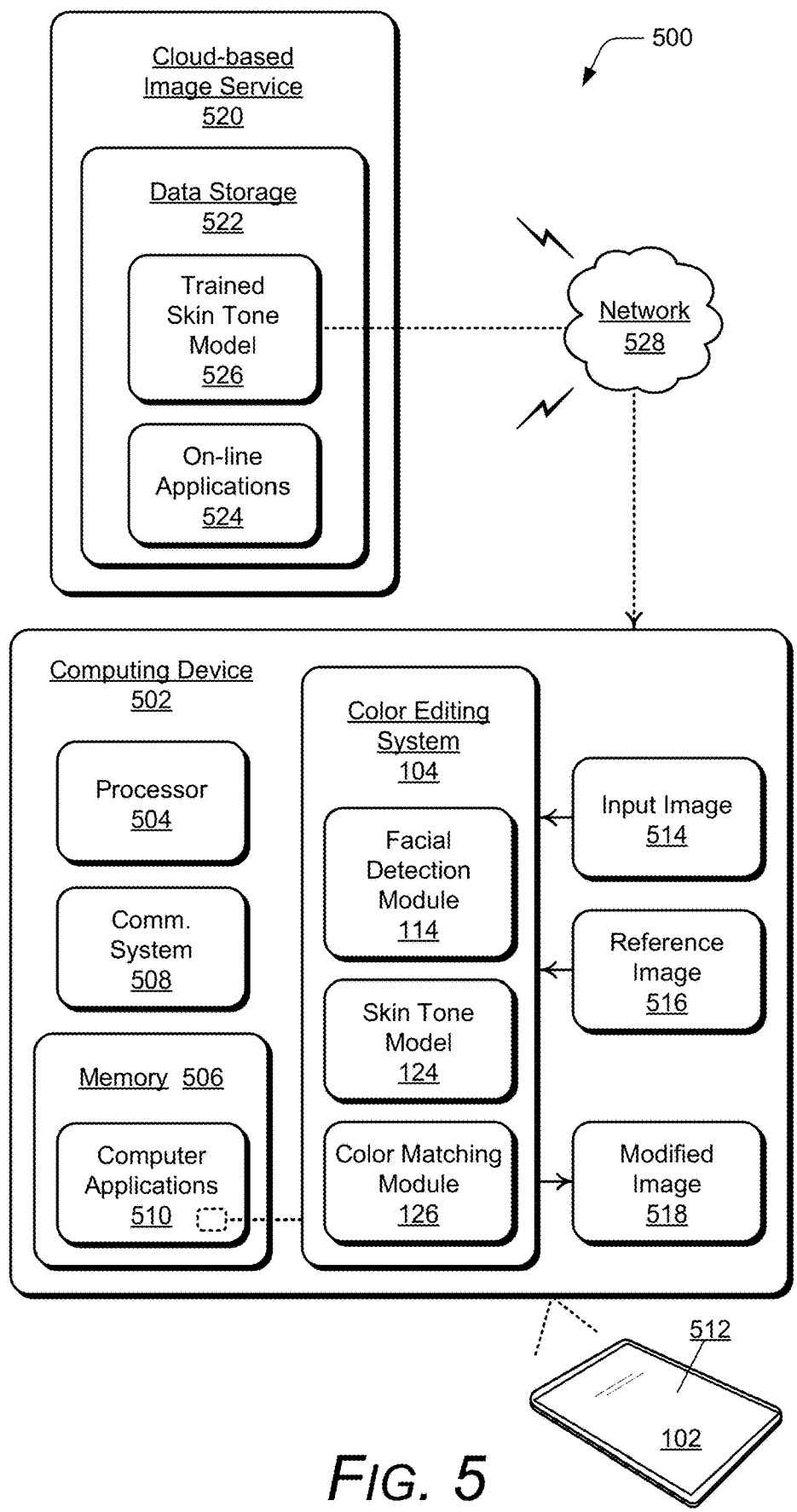
FIG. 5 illustrates an example environment in which aspects of skin tone assisted digital image color matching can be implemented.

FIG. 5 illustrates an example environment 500 in which aspects of skin tone assisted digital image color matching can be implemented. The example environment 500 includes a computing device 502, such as the tablet device 102 shown in FIG. 1, the mobile device 400 shown in FIG. 4, or any other type of a mobile phone, media playback, computing, communication, gaming, entertainment, portable electronic media device, or computer device. The computing device 502 can be implemented with various components, such as a processor 504 (or processing system) and memory 506, and with any number and combination of differing components as further described with reference to the example device shown in FIG. 10. Although not shown, the computing device 502 can include a power source, such as a battery, to power the various device components. Further, the computing device 502 can include different wireless radio systems, such as for Wi-Fi, Bluetooth™, Mobile Broadband, LTE, or any other wireless communication system or format. Generally, the computing device 502 implements a communication system 508 that includes a radio device, antenna, and chipset that is implemented for wireless communication with other devices, networks, and services.

The computing device 502 includes one or more computer applications 510, any of which may generate a user interface for display on a display device 512 of the computing device. As noted above, the computer applications 510 can include many different types of computer applications that implement features or functions that provide for graphic design, publication development, artistic creations, digital photo image enhancement, digital video frame enhancement, and the like. Any of the different types of computer applications 510 can include the color editing system 104 that implements embodiments of skin tone assisted digital image color matching, as illustrated and described above with reference to FIGS. 1-4.

The color editing system 104 includes the facial detection module 114, the skin tone model 124, and the color matching module 126, each of which may be implemented as an independent or integrated module of the color editing system. The color editing system 104 can be implemented on the computing device 502 as a software application or module, such as computer-executable software instructions that are executable with the processor 504 (or with a processing system) to implement embodiments described herein. The color editing system 104 can be stored on computer-readable storage memory (e.g., the device memory 506), such as any suitable memory device or electronic data storage implemented in the computing device. Although shown as a separate module or component, the color editing system 104 may be integrated as a module or component with any of the computer applications 510 in implementations of skin tone assisted digital image color matching.

As described above, the color editing system 104 can receive an input image 514 that a user of the computing device wants to visually enhance by color matching. The user can also select any reference image 516 that has the overall color features style, and/or brightness to transfer or apply to the selected input image 514 for the color matching. The color matching module 126 of the color editing system 104 can then generate a modified image 518 from the input image 514 based on the color features of the reference image 516, where the color features can include using the face skin tones of the respective faces in a face group pair as part of the color features applied to modify the input image.

The example environment 500 also includes a cloud-based image service 520, such as Adobe Creative Cloud® that is accessible by client devices, to include the computing device 502, the tablet device 102, and the mobile device 400. The cloud-based image service 520 includes data storage 522 that may be implemented as any suitable memory, memory device, or electronic data storage for network-based data storage. The data storage can maintain an instance or instantiation of the color editing system 104, as well as on-line applications 524 (e.g., as network-based applications), that are accessible by a computer application 510 from the computing device 502. Examples of the on-line applications 524 include Adobe Photoshop® and Lightroom® for digital image creation and editing, as well as Adobe Premier Pro® for video editing.

The cloud-based image service 520 can also be implemented with server devices that are representative of one or multiple hardware server devices of the image service, and the hardware server devices can be utilized to train the skin tone model, which the data storage 522 maintains as the trained skin tone model 526. Further, the cloud-based image service 520 can be implemented with various components, such as a processing system and memory, as well as with any number and combination of differing components as further described with reference to the example device shown in FIG. 10 to implement the services, applications, servers, and other features of skin tone assisted digital image color matching.

The example environment 500 also includes a network 528, and any of the devices, servers, and/or services described herein can communicate via the network, such as for data communication between the computing device 502 and the cloud-based image service 520. The network can be implemented to include a wired and/or a wireless network. The network can also be implemented using any type of network topology and/or communication protocol, and can be represented or otherwise implemented as a combination of two or more networks, to include IP-based networks and/or the Internet. The network may also include mobile operator networks that are managed by a mobile network operator and/or other network operators, such as a communication service provider, mobile phone provider, and/or Internet service provider.

Example methods 600, 700, 800, and 900 are described with reference to respective FIGS. 6, 7, 8, and 9 in accordance with one or more aspects of skin tone assisted digital image color matching. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively, or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 6:
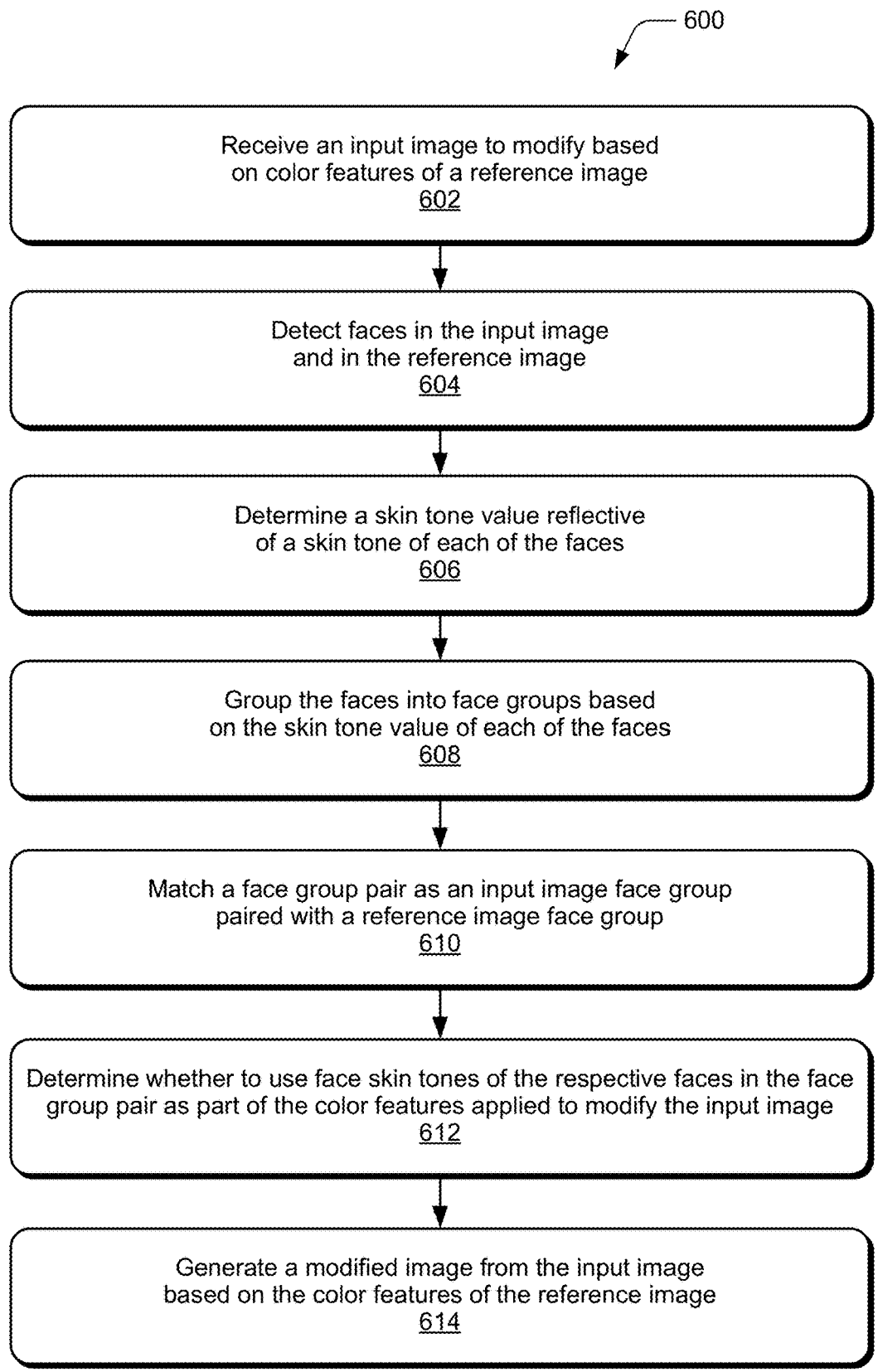
FIG. 6 illustrates an example method of skin tone assisted digital image color matching in accordance with one or more implementations.

FIG. 6 illustrates example method(s) 600 of skin tone assisted digital image color matching, and is generally described with reference to the color editing system as shown and described with reference to FIGS. 1-5. The order in which the method is described is not intended to be construed as a limitation, and any number or combination of the method operations can be combined in any order to implement a method, or an alternate method.

At 602, an input image is received to modify based on color features of a reference image. For example, the color editing system 104 implemented by the device 102 can receive the input image 108 that has color features a user of the device wants to visually enhance by color matching. The color editing system 104 can also receive the reference image 110 that has the overall color features style, and/or brightness to transfer or apply to the selected input image for the color matching. Generally, an input image and/or a reference image can be any type of a digital video frame from a video clip, a digital photo, or a digital image. Similarly, the color editing system 104 implemented by the mobile device 400 can receive the input image 418, such as by user selection via the user interface 416, where the input image has color features the user of the mobile device wants to visually enhance by color matching. The color editing system 104 can also receive the reference image 420, such as by user selection via the user interface 416, where the reference image has the overall color features to transfer or apply to the selected input image 418 for the color matching.

At 604, faces are detected in the input image and in the reference image. For example, the facial detection module 114 of the color editing system 104 can detect the faces in the input image 108 and in the reference image 110, such as by any known technique that may be implemented for facial detection of a face in an image. Although, facial recognition technology is designed to identify or verify a person from a digital image or from a video frame of a video clip, the facial detection module 114 as described herein is utilized to a lesser degree to detect the occurrence of faces in image regions of the input image 108 and in image regions of the reference image 110, rather than for full recognition and identification of a particular person depicted in the images. Similarly, the facial detection module 114 of the color editing system 104 that is implemented by the mobile device 400 can detect faces 424 in the input image 418 and in the reference image 420.

At 606, a skin tone value reflective of a skin tone of each of the faces is determined. For example, the skin tone model 124 of the color editing system 104 can determine the skin tone values of each of the faces detected in the input image 108 and in the reference image 110, where the skin tone values are reflective of the skin tone of each of the detected faces. In implementations, image regions of the input image 108 and the reference image 110 that include the faces are input into the skin tone model 124, which can be implemented as a trained convolutional neural network designed to determine the skin tone values of the respective faces based on at least skin tone identifiers and lighting features corresponding to the image regions. Similarly, skin tone model 124 of the color editing system 104 that can be implemented by the mobile device 400 can determine a skin tone value 426 reflective of the skin tone of each of the faces 424 that are detected by the facial detection module 114 in the input image 418 and/or in the reference image 420. In implementations to determine the skin tone value reflective of a skin tone of a face in an image, the color matching module 126 can perform actions of the method shown and described with reference to FIG. 7.

At 608, the faces are grouped into face groups based on the skin tone value of each of the faces. For example, the color matching module 126 of the color editing system 204 can group the faces that are detected in the input image 108 and in the reference image 110 into face groups based on the skin tone value of each of the faces. The one or more face groups each include similar skin tone faces that are grouped from the input image 108 and grouped from the reference image 110 based on an average skin tone value difference less than or equal to a grouping threshold. Similarly, the color matching module 126 of the color editing system 104 that can be implemented by the mobile device 400 can group the faces 424 detected in the input image 418 and in the reference image 420 into one or more face groups 428 based on the skin tone value of each of the faces, as determined by the skin tone model 124.

The faces detected in the input image 418 by the facial detection module 114 are the input image faces that can be grouped into one or more input image face groups 430. Similarly, the faces detected in the reference image 420 by the facial detection module 114 are the reference image faces that are grouped into one or more reference image face groups 432. Generally, the faces 424 included in a face group 428 have a similar skin tone and appearance, and have a skin tone value difference less than or equal to a grouping threshold. In implementations to group the faces into the face groups, the color matching module 126 can perform actions of the method shown and described with reference to FIGS. 8A and 8B. The color matching module 126 can compare the skin tone value differences with other skin tone values of the faces in an input image face group or a reference image face group, and the difference is compared to the threshold to determine whether to add a face to an input image face group or reference image face group that has already been created, or create a new face group.

At 610, a face group pair is matched as an input image face group paired with a reference image face group. For example, the color matching module 126 of the color editing system 104 implemented by the device 102 can match a face group pair as an input image face group and a reference image face group. Similarly, the color matching module 126 of the color editing system 104 that can be implemented by the mobile device 400 can match the face group pair 434 as the input image face group 430 having the largest possible area sum of the input image regions that meets the matching criteria and the reference image face group 432 having the largest possible area sum of the reference image regions that meets the matching criteria, which is the face group pair 434 having a difference of the respective average skin tone values being less than or equal to the matching threshold.

In implementations to match the face group pair 434, the color matching module 126 can perform actions of the method shown and described with reference to FIG. 9, to include calculating an average skin tone value from the skin tone values 426 of the respective one or more faces 424 in each of the one or more input image face groups 430 and the one or more reference image face groups 432. The color matching module 126 can also identify input image regions of the input image 418 and reference image regions of the reference image 420 that include the faces 424, and calculate area sums of the input image regions and the reference image regions corresponding to the faces 424 grouped in the respective one or more input image face groups 430 and the respective one or more reference image face groups 432. The color matching module 126 can determine the face group pair based on a matching criteria of the face group pair having a difference of the respective average skin tone values being less than or equal to a matching threshold. The color matching module 126 can then match the face group pair 434 as the input image face group 430 having a largest possible area sum of the input image regions that meets the matching criteria and the reference image face group 432 having a largest possible area sum of the reference image regions that meets the matching criteria, which is the face group pair 434 having a difference of the respective average skin tone values being less than or equal to the matching threshold.

At 612, a determination is made whether to use face skin tones of the respective faces in the face group pair as part of the color features applied to modify the input image. For example, the color matching module 126 of the color editing system 104 implemented by the device 102 can determine whether or not to use the face skin tones of the respective faces in the face group pair as part of the color features applied to modify the input image 108 based on whether the face group pair has a difference of average skin tone values of the input image face group and the reference image face group being less than or equal to the matching threshold. Similarly, the color matching module 126 of the color editing system 104 implemented by the mobile device 400 may determine not to use the image regions that include the faces 424 in an input image and in a reference image for color matching. For example, if the average skin tone difference between the input image face group 430 and the reference image face group 432 exceeds the matching threshold for face group matching, the image regions that include the faces 424 may not be used for the color matching so as not to alter the appearance of the skin tone of persons in the input image 418 when the color features of the reference image 420 are applied to the input image.

At 614, a modified image is generated from the input image based on the color features of the reference image. For example, the color matching module 126 of the color editing system 104 implemented by the device 102 can generate the modified image 112 from the input image 108 based on the color features of the reference image 110, where the color features include using the face skin tones of the respective faces in the face group pair as part of the color features applied to modify the input image. Notably, the modified image 112 can be generated to include color matching midtone color features of the reference image 110 applied to the input image 108, where the color matching includes using the face skin tones in the face group pair as part of the midtone color features. Similarly, the color matching module 126 of the color editing system 104 implemented by the mobile device 400 can generate the modified image 422 from the input image 418 based on the color features of the reference image 420, where the color features can include using the face skin tones of the respective faces in the face group pair 434 as part of the color features applied to modify the input image.

Figure 7:
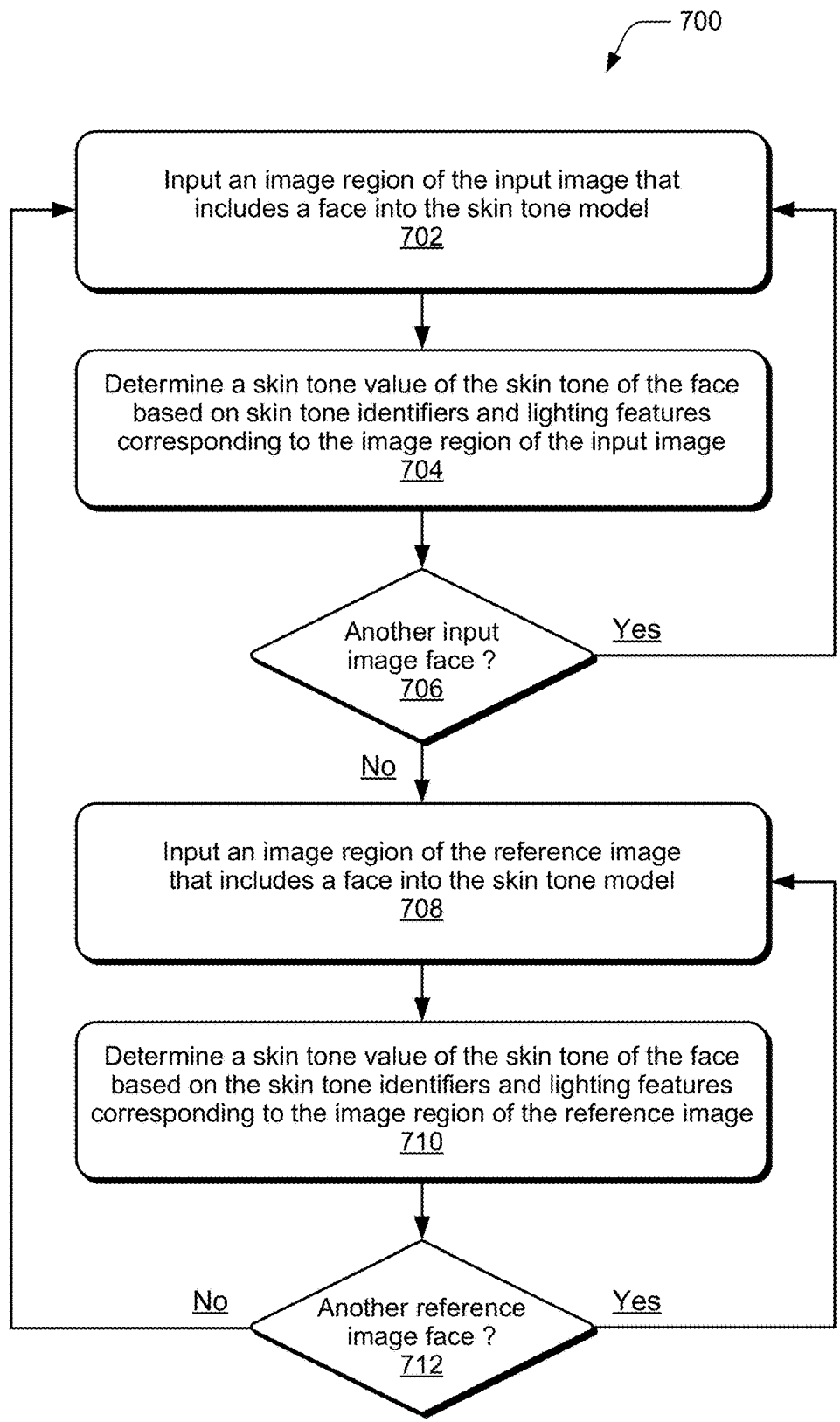
FIG. 7 illustrates an example method of a color editing system determining skin tone values in accordance with one or more implementations of skin tone assisted digital image color matching.

FIG. 7 illustrates example method(s) 700 of skin tone assisted digital image color matching, and is generally described with reference to the color editing system to determine a skin tone value as shown and described with reference to FIGS. 1-5. The order in which the method is described is not intended to be construed as a limitation, and any number or combination of the method operations can be combined in any order to implement a method, or an alternate method.

At 702, an image region of the input image that includes a face is input into the skin tone model. For example, the skin tone model 124 of the color editing system 104 implemented by the device 102 can receive the image region 116 in the input image 108, where the image region 116 includes the face of the person in the input image as detected by the facial detection module 114.

At 704, a skin tone value of the skin tone of the face is determined based on skin tone identifiers and lighting features corresponding to the image region of the input image. For example, the skin tone model 124 can determine the skin tone value of the skin tone of the face of the person in the image region 116 in the input image 108. In implementations, the skin tone model 124 is a convolutional neural network that is trained to determine skin tone values of the faces based on skin tone identifiers (e.g., labeled skin tone values) and varying lighting features that may alter the skin tone appearance of the faces in the images.

At 706, a determination is made as to whether there is another face detected in the input image. For example, the color editing system 104 can determine whether the input image includes another face as detected by the facial detection module (at block 604). If the input image includes another face (i.e., "Yes" from 706), then the method continues at 702 to input another image region of the input image 108 that includes the additional face into the skin tone model 124 and determine the skin tone value of the skin tone of the additional face at 704.

If the input image does not include another face (i.e., "No" from 706), then at 708, an image region of the reference image that includes a face can be input into the skin tone model. For example, the skin tone model 124 of the color editing system 104 implemented by the device 102 can receive the image region 118 in the reference image 110, where the image region 118 includes the face of the person in the reference image as detected by the facial detection module 114.

At 710, a skin tone value of the skin tone of the face is determined based on skin tone identifiers and lighting features corresponding to the image region of the reference image. For example, the skin tone model 124 can determine the skin tone value of the skin tone of the face of the person in the image region 118 in the reference image 110 based on skin tone identifiers (e.g., labeled skin tone values) and varying lighting features that may alter the skin tone appearance of the faces in the images.

At 712, a determination is made as to whether there is another face detected in the reference image. For example, the color editing system 104 can determine whether the reference image 110 includes another face as detected by the facial detection module (at block 604). If the reference image includes another face (i.e., "Yes" from 712), then the method continues at 708 to input the image region of reference image 110 that includes the additional face into the skin tone model 124 and determine the skin tone value of the skin tone of the additional face at 710. For example, the reference image 110 includes two additional image regions 120, 122 that include faces and are input into the skin tone model 124 to determine the skin tone value of the skin tone of the faces. If the reference image does not include another face (i.e., "No" from 712), then the method can continue at 702.

Figure 8A:
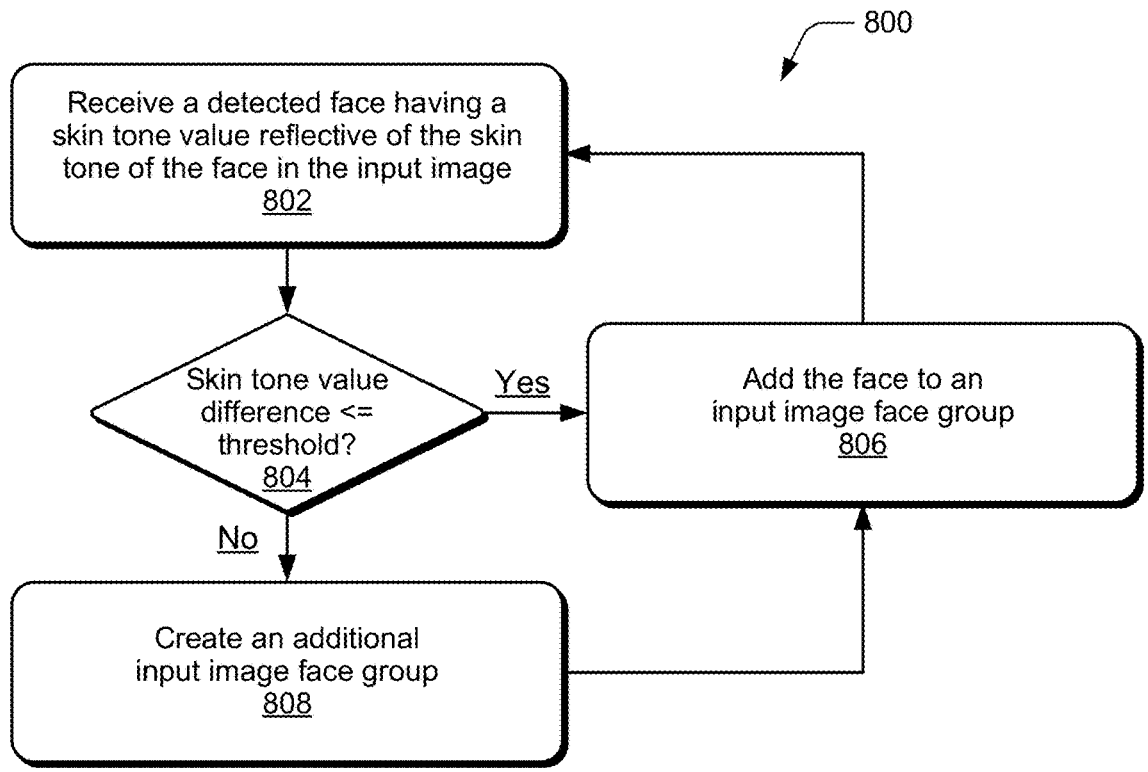
FIGS. 8A and 8B illustrate example methods of a color editing system grouping detected faces in an input image and in a reference image into face groups in accordance with one or more implementations of skin tone assisted digital image color matching.
Figure 8B:
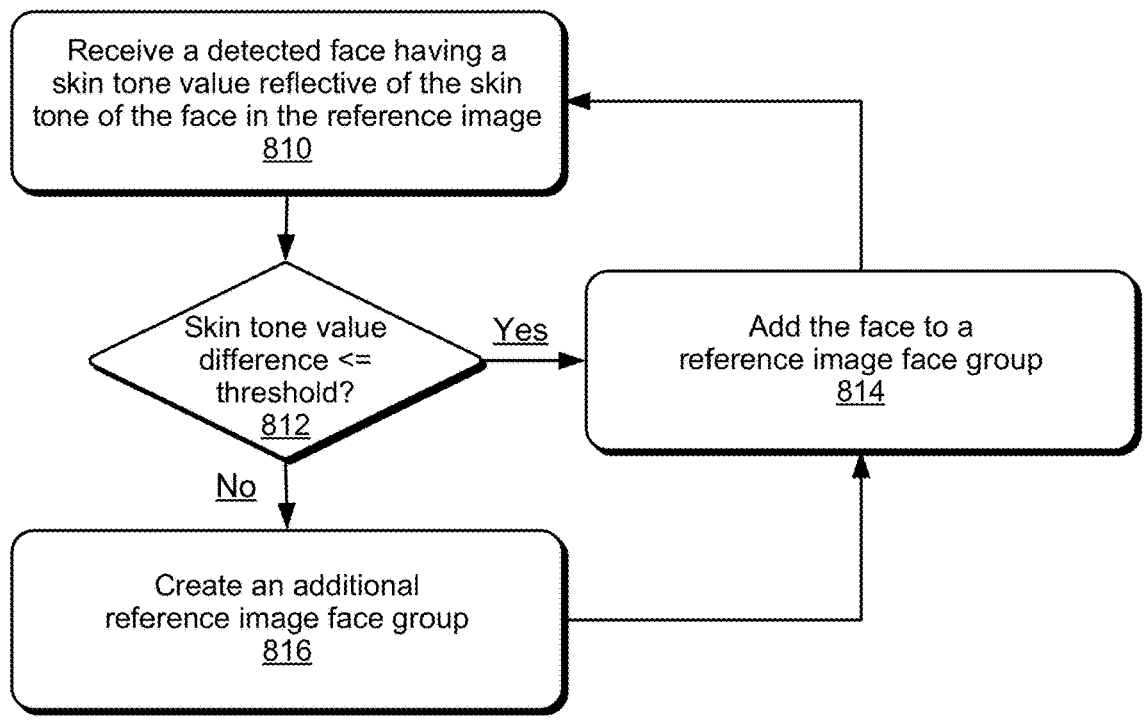

FIGS. 8A and 8B illustrate example method(s) 800 of skin tone assisted digital image color matching, and is generally described with reference to the color editing system to group detected faces in the input image and in the reference image into the face groups as shown and described with reference to FIGS. 1-5. The order in which the method is described is not intended to be construed as a limitation, and any number or combination of the method operations can be combined in any order to implement a method, or an alternate method.

At 802 (FIG. 8A), a detected face having a skin tone value reflective of the skin tone of a face in the input image is received. For example, the color matching module 126 of the color editing system 104 implemented by the device 102 can receive an input image face having a skin tone value reflective of the skin tone of the face in the input image 108. The faces detected in the input image 108 by the facial detection module 114 are the input image faces that may be grouped into one or more input image face groups.

At 804, a determination is made as to whether the skin tone value difference of the face in the input image is less than or equal to a grouping threshold as compared to other faces in an input image face group. For example, the color matching module 126 of the color editing system 104 can compare the skin tone value difference of the input image face based on other skin tone values of the faces existing in an input image face group, and the difference is compared to the threshold to determine whether to add the face to the input image face group that has already been created, or create a new face group. If the skin tone value difference of the face in the input image region as compared to the other skin tone values of the faces existing in an input image face group is less than or equal to the grouping threshold (i.e., "Yes" from 804), then at 806, the face can be added to the input image face group (or the first input image face group is created).

In the example 100 shown in FIG. 1, the color matching module 126 would only generate one input image face group, which includes the face of the person corresponding to the image region 116 in the input image 108. For an input image that includes more than one face shown in the image, an input image face group includes one or more of the input image faces having skin tone value differences less than or equal to the grouping threshold so that the faces included in a particular input image face group have a similar skin tone and appearance. The method then continues at 802 to receive and evaluate another input image face for input image face grouping.

If the skin tone value difference of the face in the input image region as compared to the other skin tone values of the faces existing in an input image face group is greater than the grouping threshold (i.e., "No" from 804), then at 808, an additional input image face group is created and the face in the input image region is added to the new input image face group. For example, the color matching module 126 can create an additional input image face group if the received input image face has a skin tone value difference greater than the grouping threshold, where the face does not have a skin tone value that would indicate a similar appearance to one or more faces in other input image face groups. The method then continues at 806 to add the input image face to the additional input image face group that has been created.

At 810 (FIG. 8B), a detected face having a skin tone value reflective of the skin tone of a face in the reference image is received. For example, the color matching module 126 of the color editing system 104 implemented by the device 102 can receive a reference image face having a skin tone value reflective of the skin tone of the face in the reference image 110. The faces detected in the reference image 110 by the facial detection module 114 are the reference image faces that may be grouped into one or more reference image face groups.

At 812, a determination is made as to whether the skin tone value difference of the face in the reference image is less than or equal to a grouping threshold as compared to other faces in a reference image face group. For example, the color matching module 126 of the color editing system 104 can compare the skin tone value difference of the reference image face based on other skin tone values of the faces existing in a reference image face group, and the difference is compared to the threshold to determine whether to add the face to the reference image face group that has already been created, or create a new face group. If the skin tone value difference of the face in the reference image region as compared to the other skin tone values of the faces existing in a reference image face group is less than or equal to the grouping threshold (i.e., "Yes" from 812), then at 814, the face is added to the reference image face group (or the first reference image face group is created).

In the example 100 shown in FIG. 1, the color matching module 126 would generate two reference image face groups, where a reference image face group includes one or more of the reference image faces having skin tone value differences less than or equal to the grouping threshold. For example, the color matching module 126 would generate a first reference image face group, which includes the face of the person corresponding to the image region 118 in the reference image 110. The color matching module 126 would also generate a second reference image face group, which includes the faces of the people corresponding to the image regions 120, 122 in the reference image.

If the skin tone value difference of the face in the reference image region as compared to the other skin tone values of the faces existing in a reference image face group is greater than the grouping threshold (i.e., "No" from 812), then at 816, an additional reference image face group is created and the face in the reference image region is added to the new reference image face group. For example, the color matching module 126 can create an additional reference image face group if the received reference image face has a skin tone value difference greater than the grouping threshold, where the face does not have a skin tone value that would indicate a similar appearance to one or more faces in other reference image face groups. The method then continues at 814 to add the reference image face to the additional reference image face group that has been created.

Figure 9:
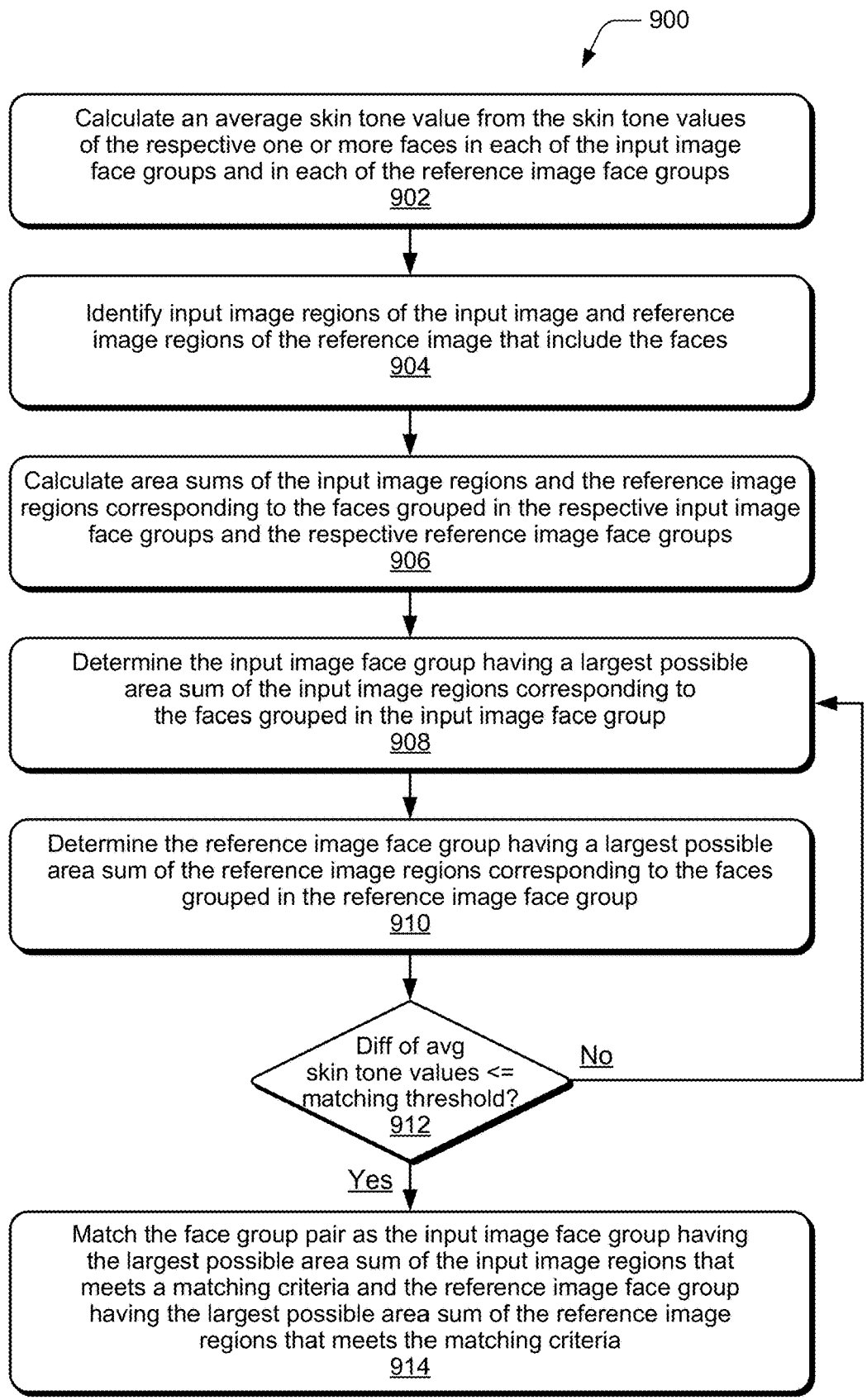
FIG. 9 illustrates an example method of a color editing system matching a face group pair in accordance with one or more implementations of skin tone assisted digital image color matching.

FIG. 9 illustrates example method(s) 900 of skin tone assisted digital image color matching, and is generally described with reference to the color editing system to match a face group pair as shown and described with reference to FIGS. 1-5. The order in which the method is described is not intended to be construed as a limitation, and any number or combination of the method operations can be combined in any order to implement a method, or an alternate method.

At 902, an average skin tone value is calculated from the skin tone values of the respective one or more faces in each of the input image face groups and in each of the reference image face groups. For example, the color matching module 126 of the color editing system 104 implemented by the device 102 can calculate an average skin tone value from the skin tone values of the respective faces in each of the one or more input image face groups and in each of the one or more reference image face groups.

At 904, input image regions of the input image and reference image regions of the reference image that include the faces are identified. For example, the color matching module 126 of the color editing system 104 can receive the input image regions of the input image 108 and reference image regions of the reference image 110 that include the faces, such as determined by the facial detection module 114.

At 906, area sums of the input image regions and the reference image regions corresponding to the faces grouped in the respective input image face groups and the respective reference image face groups are calculated. For example, the color matching module 126 of the color editing system 104 can calculate area sums of the input image regions and the reference image regions corresponding to the faces grouped in the respective input image face groups and the respective reference image face groups. The area sum of an image face group can be calculated as: Area Sum=$(\Sigma_{k=1}^{n} A_k)$, where n is the number of faces in an image face group (e.g., in an input image face group or in a reference image face group), and $A_k$ is the area of the $k^{th}$ face of the group.

At 908, the input image face group having a largest possible area sum of the input image regions corresponding to the faces grouped in the input image face group is determined. For example, the color matching module 126 of the color editing system 104 can determine the input image face group having a largest possible area sum of the input image regions corresponding to the faces grouped in the input image face group. Similarly at 910, the reference image face group having a largest possible area sum of the reference image regions corresponding to the faces grouped in the reference image face group is determined. For example, the color matching module 126 of the color editing system 104 can determine the reference image face group having a largest possible area sum of the reference image regions corresponding to the faces grouped in the reference image face group. The input image face group with the largest possible area sum and the reference image face group with the largest possible area sum meet a matching criteria of the face group pair having a difference of the respective average skin tone values being less than or equal to the matching threshold.

At 912, a determination is made as to whether a difference of the respective average skin tone values of the input image face group and the reference image face group is less than or equal to a matching threshold. For example, the color matching module 126 of the color editing system 104 can determine whether a difference of the respective average skin tone values of the input image face group and the reference image face group is less than or equal to the matching threshold.

If the difference of the respective average skin tone values of the input image face group and the reference image face group is less than or equal to the matching threshold (i.e., "Yes" from 912), then at 914, the face group pair is matched as the input image face group having the largest possible area sum of the input image regions that meets the matching criteria and the reference image face group having the largest possible area sum of the reference image regions that meets the matching criteria. As noted above, the input image face group with the largest possible area sum and the reference image face group with the largest possible area sum meet the matching criteria of the face group pair having a difference of the respective average skin tone values being less than or equal to the matching threshold.

If the difference of the respective average skin tone values of the input image face group and the reference image face group is more than the matching threshold (i.e., "No" from 912), then the method continues at 908 and 910 to iteratively determine an alternative input image face group and/or an alternative reference image face group to match as the face group pair. Accordingly, the group matching to determine the face group pair is an iterative process to find the largest possible matching input image and reference image face groups having a maximum area sum, and with an average skin tone value difference less than or equal to the matching threshold. In implementations, the matching threshold may be set at a value of two (2.0) so that faces of the input image face group and the reference image face group have similar skin tone values.

Figure 10:
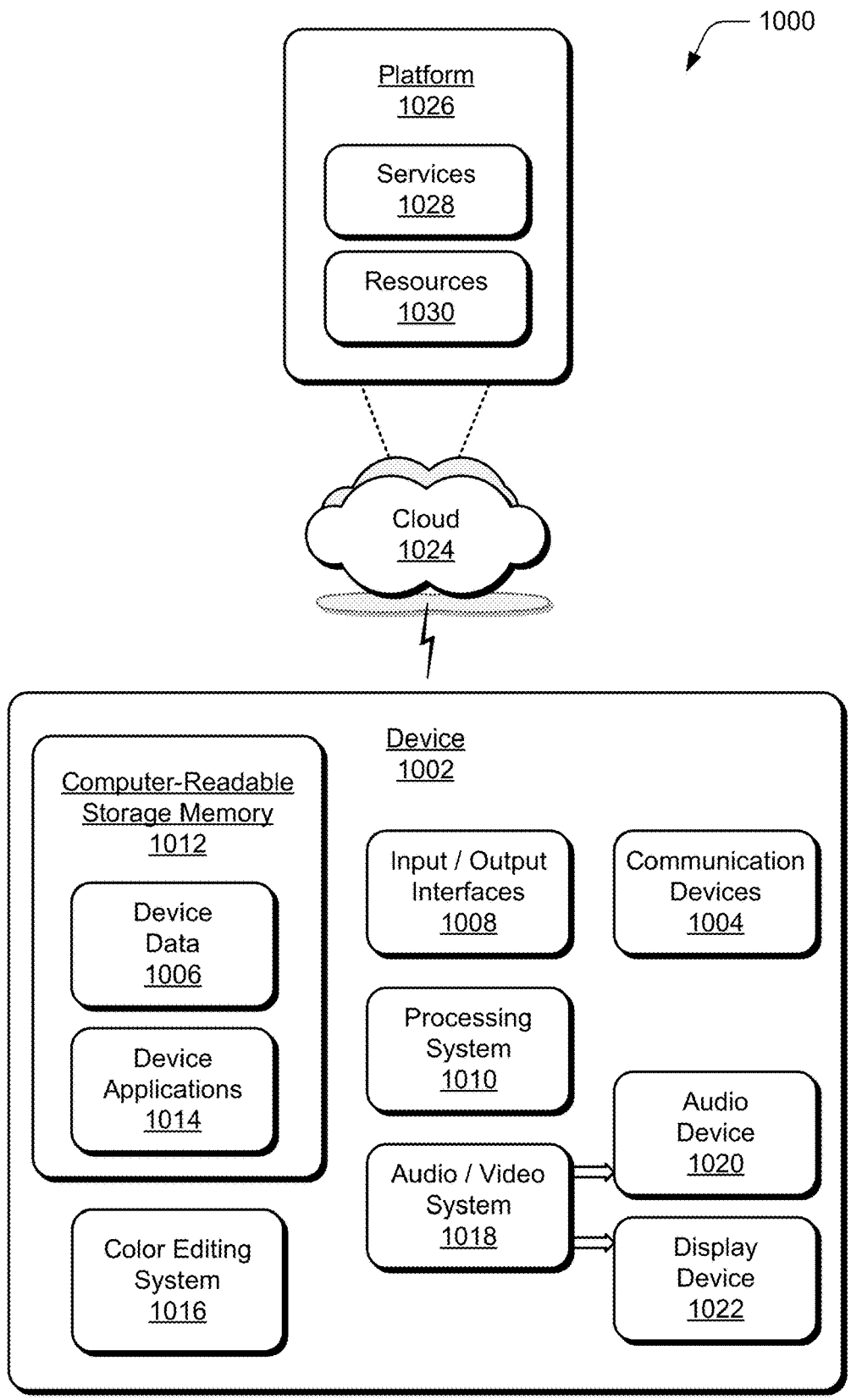
FIG. 10 illustrates an example system with an example device that can implement aspects of skin tone assisted digital image color matching.

FIG. 10 illustrates an example system 1000 that includes an example device 1002, which can implement techniques of skin tone assisted digital image color matching. The example device 1002 can be implemented as any of the computing devices, mobile devices, server devices, and/or services described with reference to the previous FIGS. 1-9, such as any type of computing device, client device, mobile phone, tablet, communication, entertainment, gaming, media playback, and/or other type of device. For example, the device 102, the mobile device 400, and the computing device 502 may be implemented as the example device 1002.

The example device 1002 includes communication devices 1004 that enable wired and/or wireless communication of device data 1006, such as the various digital images, as well as computer applications data and content that is transferred from one computing device to another, and/or synched between multiple computing devices. The device data 1006 can include any type of audio, video, image, and/or graphic data that is generated by applications executing on the device. The communication devices 1004 can also include transceivers for cellular phone communication and/or for network data communication.

The device 1002 also includes input/output (I/O) interfaces 1008, such as data network interfaces that provide connection and/or communication links between the device, data networks, and other devices. The I/O interfaces can be used to couple the device to any type of components, peripherals, and/or accessory devices, such as a digital camera device and/or computer input device that may be integrated with the example device 1002. The I/O interfaces also include data input ports via which any type of data, media content, and/or inputs can be received, such as user inputs to the device, as well as any type of audio, video, and/or image data received from any content and/or data source.

The device 1002 includes a processing system 1010 that may be implemented at least partially in hardware, such as with any type of microprocessors, controllers, and the like that process executable instructions. The processing system can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The device 1002 may further include any type of a system bus or other data and command transfer system that couples the various components within the device. A system bus can include any one or combination of different bus structures and architectures, as well as control and data lines.

The example device 1002 also includes computer-readable storage memory 1012, such as data storage devices implemented in hardware that can be accessed by a computing device, and that provide persistent storage of data and executable instructions (e.g., software applications, modules, programs, functions, and the like). The computer-readable storage memory described herein excludes propagating signals. Examples of computer-readable storage memory include volatile memory and non-volatile memory, fixed and removable media devices, and any suitable memory device or electronic data storage that maintains data for computing device access. The computer-readable storage memory 1012 can include various implementations of random access memory (RAM), read-only memory (ROM), flash memory, and other types of storage memory in various memory device configurations.

The computer-readable storage memory 1012 provides storage of the device data 1006 and various device applications 1014, such as an operating system that is maintained as a software application with the computer-readable storage memory and executed by the processing system 1010. In this example, the device 1002 includes a color editing system 1016 that implements the described techniques of skin tone assisted digital image color matching, and may be implemented with hardware components and/or in software as one of the device applications 1014, such as when the example device 1002 is implemented as the device 102, the mobile device 400, and/or the computing device 502 shown in respective FIGS. 1, 4, and 5. An example of the color editing system 1016 includes the color editing system 104 that is implemented as a software application and/or as hardware components, such as by the device 102, the mobile device 400, and/or the computing device 502 as shown and described with reference to FIGS. 1-9. In implementations, the color editing system 1016 may include independent processing, memory, and logic components as a computing and/or electronic device integrated with the device 1002.

The device 1002 also includes an audio and/or video system 1018 that generates audio data for an audio device 1020 and/or generates display data for a display device 1022. The audio device and/or the display device include any devices that process, display, and/or otherwise render audio, video, display, and/or image data. In implementations, the audio device and/or the display device are integrated components of the example device 1002. Alternatively, the audio device and/or the display device are external, peripheral components to the example device. In embodiments, at least part of the techniques described for skin tone assisted digital image color matching may be implemented in a distributed system, such as over a "cloud" 1024 in a platform 1026. The cloud 1024 includes and/or is representative of the platform 1026 for services 1028 and/or resources 1030. For example, the services 1028 may include the cloud-based image service 520 as shown and described with reference to FIG. 5.

The platform 1026 abstracts underlying functionality of hardware, such as server devices (e.g., included in the services 1028) and/or software resources (e.g., included as the resources 1030), and connects the example device 1002 with other devices, servers, etc. The resources 1030 may also include applications and/or data that can be utilized while computer processing is executed on servers that are remote from the example device 1002. Additionally, the services 1028 and/or the resources 1030 may facilitate subscriber network services, such as over the Internet, a cellular network, or Wi-Fi network. The platform 1026 may also serve to abstract and scale resources to service a demand for the resources 1030 that can be implemented via the platform, such as in an interconnected device embodiment with functionality distributed throughout the system 1000. For example, the functionality may be implemented in part at the example device 1002 as well as via the platform 1026 that abstracts the functionality of the cloud 1024.

Although implementations of skin tone assisted digital image color matching have been described in language specific to features and/or methods, the appended claims are not necessarily limited to the specific features or methods described. Rather, the specific features and methods are disclosed as example implementations of skin tone assisted digital image color matching, and other equivalent features and methods are intended to be within the scope of the appended claims. Further, various different examples are described and it is to be appreciated that each described example can be implemented independently or in connection with one or more other described examples.

The invention claimed is:

1. A method implemented by a computing device, the method comprising:
   receiving an input image to modify based on color features of a reference image;
   detecting faces in the input image and in the reference image;
   determining a skin tone value reflective of a skin tone of each of the faces;
   grouping the faces into one or more face groups based on the skin tone value of each of the faces in the input image and in the reference image, the one or more face groups including an input image face group and a reference image face group; and
   generating a modified image from the input image based on the color features of the reference image, the color features applied to modify the input image including face skin tones of the faces in the reference image face group, yet maintaining the skin tone value of each of the faces from the input image in the modified image.

2. The method of claim 1, wherein the input image and the reference image are one of digital images or digital video frames.

3. The method of claim 1, wherein the grouping the faces into the one or more face groups comprises:
   grouping input image faces into one or more input image face groups, the input image face group including one or more of the input image faces having skin tone value differences less than or equal to a grouping threshold; and
   grouping reference image faces into one or more reference image face groups, the reference image face group including one or more of the reference image faces having skin tone value differences less than or equal to the grouping threshold.

4. The method of claim 3, further comprising:
   calculating an average skin tone value from the skin tone values of respective one or more faces in each of the one or more input image face groups and in each of the one or more reference image face groups.

5. The method of claim 4, further comprising:
   matching a face group pair as the input image face group paired with the reference image face group, wherein the matching the face group pair comprises:
   determining the face group pair based on a matching criteria of the face group pair having a difference of the respective average skin tone values being less than or equal to a matching threshold;
   identifying input image regions of the input image and reference image regions of the reference image that include the faces;
   calculating area sums of the input image regions and the reference image regions corresponding to the faces grouped in respective one or more input image face groups and respective one or more reference image face groups; and
   matching the face group pair as the input image face group having a largest possible area sum of the input image regions that meets the matching criteria and the reference image face group having a largest possible area sum of the reference image regions that meets the matching criteria.

6. The method of claim 5, wherein the generating the modified image includes color matching midtone color features of the reference image applied to the input image, the color matching including using the face skin tones of the faces in the face group pair as part of the midtone color features.

7. The method of claim 6, wherein the color matching the midtone color features of the reference image applied to the input image is effective to maintain original captured image color of the faces in the input image.

8. The method of claim 1, wherein the determining the skin tone value comprises:
inputting image regions of the input image and the reference image that include the faces into a skin tone model; and
utilizing the skin tone model that determines the skin tone values of the respective faces based on at least skin tone identifiers and lighting features corresponding to the image regions.

9. A device comprising:
a memory to maintain an input image and a reference image as one of digital images or digital video frames; and
a processor system configured to implement a color editing system at least partially in hardware, the color editing system including:
a facial detection module implemented to detect one or more faces in the input image and in the reference image;
a skin tone model implemented to determine a skin tone value reflective of a skin tone of each of the one or more faces; and
a color matching module implemented to:
group the one or more faces into one or more face groups based on the skin tone value of each of the one or more faces in the input image and in the reference image, the one or more face groups including an input image face group and a reference image face group; and
generate a modified image from the input image based on color features of the reference image, the color features applied to modify the input image including face skin tones of the faces in the reference image face group, yet maintain the skin tone value of each of the faces from the input image in the modified image.

10. The device of claim 9, wherein, to group the one or more faces into the one or more face groups, the color matching module is implemented to:
group input image faces into one or more input image face groups, the input image face group including one or more of the input image faces having skin tone value differences less than or equal to a grouping threshold; and
group reference image faces into one or more reference image face groups, the reference image face group including one or more of the reference image faces having skin tone value differences less than or equal to the grouping threshold.

11. The device of claim 10, wherein the color matching module is implemented to calculate an average skin tone value from the skin tone values of respective one or more faces in each of the one or more input image face groups and the one or more reference image face groups.

12. The device of claim 11, wherein the color matching module is implemented to:
match a face group pair as the input image face group paired with the reference image face group based on a matching criteria of the face group pair having a difference of the respective average skin tone values being less than or equal to a matching threshold; and
match the face group pair comprising to:
identify input image regions of the input image and reference image regions of the reference image that include the faces;
calculate area sums of the input image regions and the reference image regions corresponding to the one or more faces grouped in respective one or more input image face groups and respective one or more reference image face groups; and
match the face group pair as the input image face group having a largest possible area sum of the input image regions that meets the matching criteria and the reference image face group having a largest possible area sum of the reference image regions that meets the matching criteria.

13. The device of claim 12, wherein the color matching module of the color editing system is implemented to color match midtone color features of the reference image applied to the input image to generate the modified image using the face skin tones of the faces in the face group pair as part of the midtone color features.

14. The device of claim 13, wherein the color match by the color matching module is effective to maintain original captured image color of the one or more faces in the input image.

15. The device of claim 9, wherein the skin tone model of the color editing system is implemented to determine the skin tone values of respective one or more faces based on at least skin tone identifiers and lighting features corresponding to image regions of the input image and the reference image that include the one or more faces.

16. A method implemented by a computing device, the method comprising:
receiving an input image to modify based on color features of a reference image;
detecting one or more faces in the input image and in the reference image;
determining a skin tone value reflective of a skin tone of each of the one or more faces;
grouping the one or more faces into one or more face groups based on the skin tone value of each of the one or more faces in the input image and in the reference image, the one or more face groups including an input image face group and a reference image face group;
determining whether to use face skin tones of the respective faces in the input image face group and in the reference image face group as part of the color features applied to modify the input image; and
generating a modified image from the input image based on the color features of the reference image.

17. The method of claim 16, wherein the one or more face groups each include similar skin tone faces that are grouped from the input image and grouped from the reference image based on an average skin tone value difference less than or equal to a grouping threshold of the similar skin tone faces.

18. The method of claim 16, further comprising:
matching a face group pair as the input image face group paired with the reference image face group;
wherein the determining whether to use the face skin tones of the respective faces in the face group pair as a part of the color features applied to modify the input image is based on whether the face group pair has a difference of average skin tone values of the input image face group and the reference image face group being less than or equal to a matching threshold.

19. The method of claim 18, wherein the generating the modified image includes color matching midtone color features of the reference image applied to the input image, the color matching including using the face skin tones of the faces in the face group pair as a part of the midtone color features, the color matching effective to maintain original captured image color of the one or more faces in the input image.

20. The method of claim 16, wherein the determining the skin tone value comprises:
- inputting image regions of the input image and the reference image that include the one or more faces into a skin tone model; and
- utilizing the skin tone model that determines the skin tone values of respective one or more faces based on at least skin tone identifiers and lighting features corresponding to the image regions.

* * * * *